(12) United States Patent
Hsu et al.

(10) Patent No.: US 8,462,318 B2
(45) Date of Patent: Jun. 11, 2013

(54) DISTANCE-MEASURING SYSTEM WITH CORRECTION FUNCTION AND METHOD THEREOF

(75) Inventors: En-Feng Hsu, Hsin-Chu (TW); Chi-Chieh Liao, Hsin-Chu (TW); Chung-Yuo Wu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/397,696

(22) Filed: Feb. 16, 2012

(65) Prior Publication Data

US 2012/0206706 A1    Aug. 16, 2012

(30) Foreign Application Priority Data

Feb. 16, 2011    (TW) .............................. 100105044 A

(51) Int. Cl.
*G01C 3/00*    (2006.01)
(52) U.S. Cl.
USPC .......................................................... 356/3
(58) Field of Classification Search
USPC .......................................................... 356/3
See application file for complete search history.

(56) References Cited

U.S. PATENT DOCUMENTS

| | | | | |
|---|---|---|---|---|
| 5,552,594 A | * | 9/1996 | Vandenberg et al. | ...... 250/201.7 |
| 6,195,202 B1 | * | 2/2001 | Kusunose | ...................... 359/368 |

* cited by examiner

*Primary Examiner* — Tu Nguyen
(74) *Attorney, Agent, or Firm* — Winston Hsu; Scott Margo

(57) ABSTRACT

Distance-measuring system with correction function includes calibrating object, transflective plate, and distance-measuring device. Distance-measuring device has a first known distance and a second known distance respectively between calibrating object and transflective plate. Transflective plate is disposed between calibrating object and distance-measuring device. Distance-measuring device includes light emitting device for emitting a detecting light with lighting-error angle, image sensor with sensing-error angle, and parameter calculating circuit. First part of detecting light passes transflective plate and is reflected by calibrating object and becomes first reflecting light emitting to first imaging location of image sensor while second part of detecting light is reflected by transflective plate and becomes second reflecting light emitting to second imaging location of image sensor. Parameter-calculating circuit calculates lighting-error angle and sensing-error angle according to first and second known distances, and first and second imaging locations.

14 Claims, 13 Drawing Sheets

DISTANCE-MEASURING SYSTEM WITH CORRECTION FUNCTION AND METHOD THEREOF

BACKGROUND OF THE INVENTION

1. Field of the Invention

The present invention relates to a distance-measuring device, and more particularly, to a distance-measuring device of measuring distance according to the variation of the imaging location.

2. Description of the Prior Art

In the prior art, the distance-measuring device emits a detecting light to a measured object, and receives a reflecting light generated by the measured object reflecting the detecting light. The distance-measuring device calculates the distance between the measured object and the distance-measuring device according to the variation of the imaging location of the reflecting light. However, when the distance-measuring device senses the reflecting light from the measured object, the distance-measuring device is affected by the background light and the flicker phenomenon (for instance, the flicker of the fluorescent lamp caused by the frequency of the AC power supply) at the same time. Hence, the distance-measuring device calculates an incorrect measured distance because of the above-mentioned reason. Moreover, since the locations of the components of the distance-measuring device may shift or rotate due to the assembling error during the fabrication, the accuracy of the measured distance obtained by the distance-measuring device is further deteriorated, causing a great inconvenience.

SUMMARY OF THE INVENTION

The present invention provides a distance-measuring system with a correction function. The distance-measuring device has a calibrating object, a transflective plate, and a distance-measuring device. The distance-measuring device has a first known distance and a second known distance between the calibrating object and the transflective plate respectively. The transflective plate is disposed between the calibrating object and the distance-measuring device. The distance-measuring device has a light emitting device, an image sensor, and a parameter-calculating circuit. The light emitting device is utilized for emitting a detecting light having a lighting-error angle. The image sensor has a sensing-error angle. The parameter-calculating circuit is utilized for calculating the lighting-error angle and the sensing-error angle according to the first and second known distances, and the first and second imaging locations. Wherein the detecting light passing through the transflective plate is reflected by the calibrating object and then is transferred into a first reflecting light transmitting to a first imaging location of the image sensor, the detecting light reflected by the transflective plate is transferred into a second reflecting light transmitting to a second imaging location of the image sensor.

The present invention further provides a calibrating method. The calibrating method is utilized for calibrating a distance-measuring device. The calibrating method includes: disposing a transflective plate between the distance-measuring device and a calibrating object, wherein the distance-measuring device respectively has a first known distance and a second known distance between the transflective plate and the calibrating object; a light emitting device of the distance-measuring device emitting a detecting light for making a first part of the detecting light passing the transflective plate and reflected by the calibrating object, and becoming a first reflecting light while a second part of the detecting light being reflected by the transflective plate and becoming a second reflecting light; the first reflecting light emitting to a first imaging location of an image sensor of the distance-measuring device; the second reflecting light emitting to a second imaging location of the image sensor of the distance-measuring device; and calculating at least an error angle of the distance-measuring device according to the first and second known distances, and the first and second imaging locations.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a distance-measuring device of measuring distance according to the variation of the imaging location. The distance-measuring device of the present invention reduces the effect of the background light and the flicker phenomenon by removing the parts of background light and the flicking light from the light-sensed signals generated by the image sensor. In addition, the present invention further provides a calibrating method for calibrating the assembling error of the distance-measuring device, so as to improve the accuracy of measuring the distance.

Figure 1:
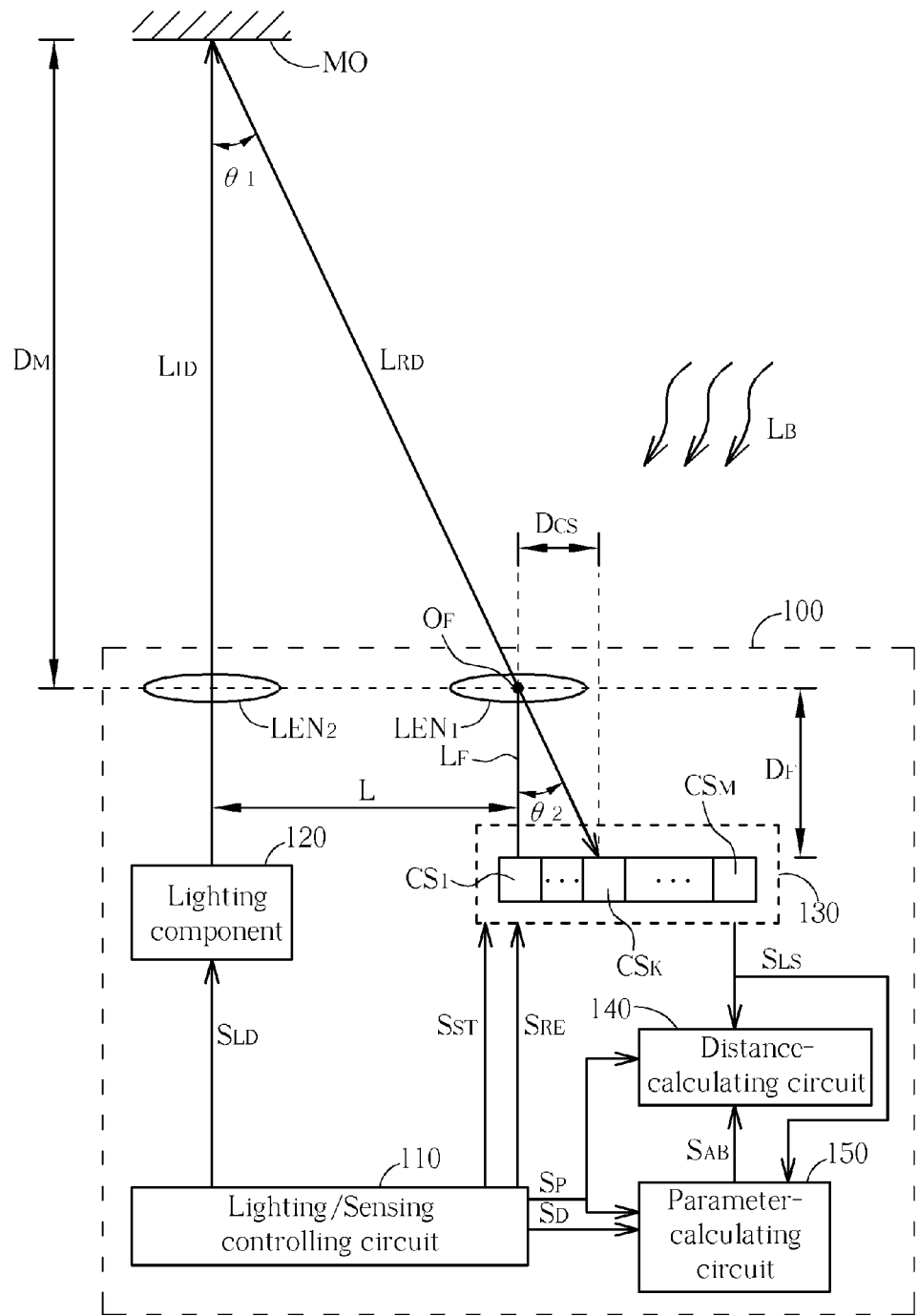
FIG. 1 and FIG. 2 are diagrams illustrating the structure and the operation principle of a distance-measuring device according to the present invention.
Figure 2:
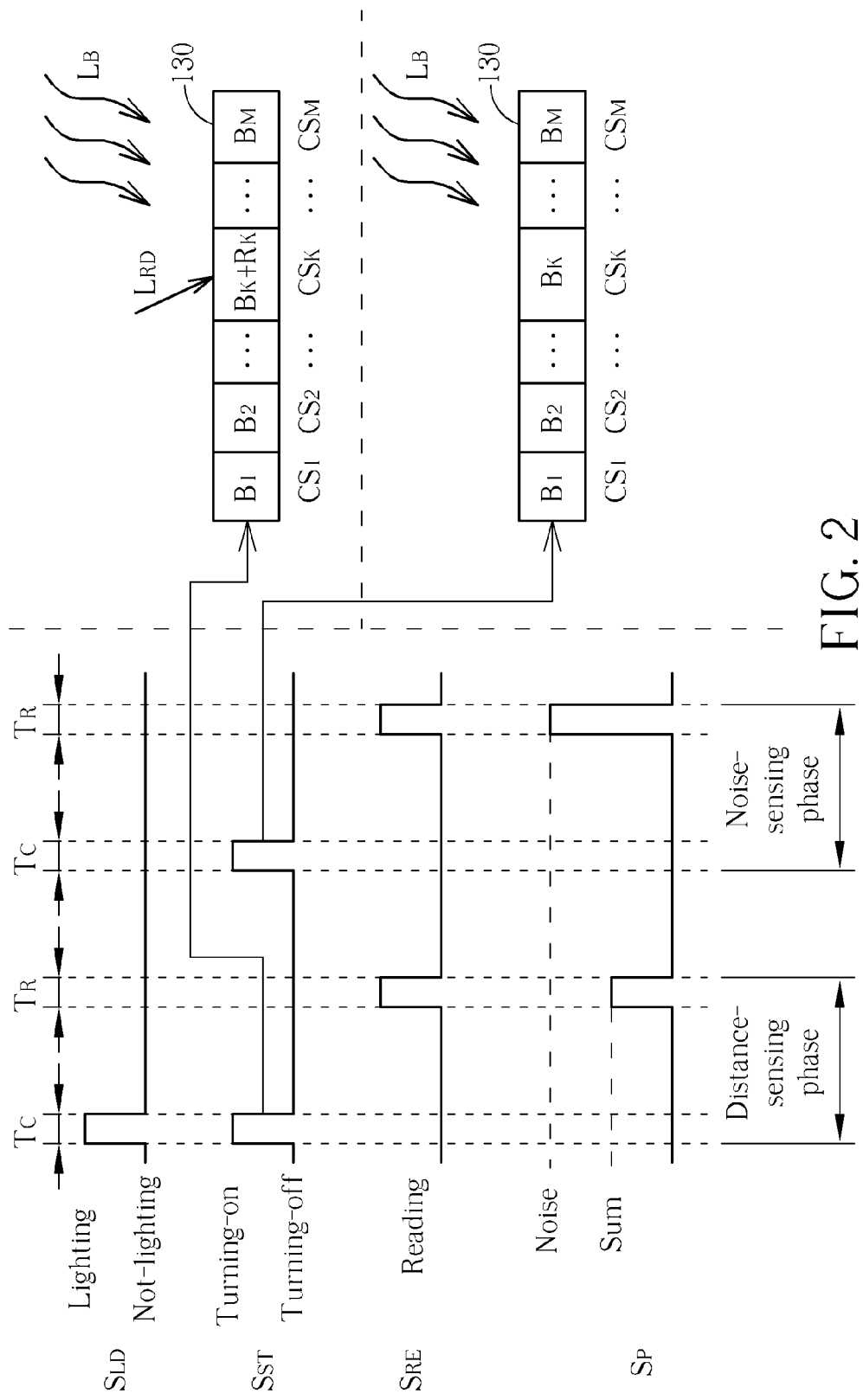

Please refer to FIG. 1 and FIG. 2. FIG. 1 and FIG. 2 are diagrams illustrating the structure and the operation principle of a distance-measuring device 100 according to the present invention. The distance-measuring device 100 measures distance according to the variation of the imaging location. More particularly, the distance-measuring device 100 measures the measured distance $D_M$ between the measured object MO and the distance-measuring device 100. The distance-measuring device 100 comprises a lighting/sensing controlling circuit 110, a light emitting device 120, an image sensor 130, a distance-calculating circuit 140, a parameter-calculating circuit 150, and a lens $LEN_1$. The coupling relations between the components of the distance-measuring device 100 are shown in FIG. 1, and hence will not be repeated again for brevity.

The lighting/sensing controlling circuit 110 generates a lighting pulse signal $S_{LD}$, a shutter pulse signal $S_{ST}$, a phase signal Sp, a reading signal $S_{RE}$, and a known-distance signal $S_D$. Measuring the distance by the distance-measuring device 100 can be divided into two phases: 1. distance-sensing phase; 2. noise-sensing phase. During the distance-sensing phase, the lighting/sensing controlling circuit 110 generates the lighting pulse signal $S_{LD}$ representing "lighting" and the shutter pulse signal $S_{ST}$ representing "turning-on", wherein the pulse widths of the lighting pulse signal $S_{LD}$ representing "lighting" and the shutter pulse signal $S_{ST}$ representing "turning-on" are both equal to $T_C$. Then the lighting/sensing controlling circuit 110 generates the reading signal $S_{RE}$ representing "reading" and the phase signal $S_P$ representing "sum", wherein the pulse widths of the reading signal $S_{RE}$ representing "reading" and the phase signal Sp representing "sum" are both equal to $T_R$. During the noise-sensing phase, the lighting/sensing controlling circuit 110 generates the shutter pulse signal $S_{ST}$ representing "turning-on" and the lighting pulse signal $S_{LD}$ represents "not-lighting" at the same time, wherein the pulse width of the shutter pulse signal $S_{ST}$ representing "turning-on" during the noise-sensing phase is still equal to $T_C$. Then the lighting/sensing controlling circuit 110 generates the reading signal representing "reading" and the phase signal $S_P$ representing "noise", wherein the pulse widths of the reading signal $S_{RE}$ representing "reading" and the phase signal $S_P$ representing "noise" are still both equal to $T_R$.

The light emitting device 120, according to the lighting pulse signal $S_{LD}$, emits a detecting light $L_{ID}$ to the measured object MO, so that the measured object MO generates a reflecting light $L_{RD}$. More particularly, when the lighting pulse signal $S_{LD}$ represents "lighting", the light emitting device 120 emits the detecting light $L_{ID}$ to the measured object MO; when the lighting pulse signal $S_{LD}$ represents "not-lighting", the light emitting device 120 does not emit the detecting light $L_{ID}$. In addition, the light emitting device 120 can be a Light-Emitting Diode (LED) or a laser diode. When the light emitting device 120 is an LED, the distance-measuring device 100 selectively comprises a lens $LEN_2$ for focusing the detecting light $L_{ID}$ emitting to the measured object MO.

The lens $LEN_1$ focuses a background light $L_B$ or the reflecting light $L_{RD}$ to the image sensor 130. The image sensor 130 includes M sensing units $CS_1 \sim CS_M$. In the present embodiment, the M sensing units $CS_1 \sim CS_M$ are illustrated to be arranged side by side for example. The width of each sensing unit is equal to a pixel width $W_{PIX}$. That is, the total width of the M sensing units $CS_1 \sim CS_M$ arranged side by side is equal to $(M \times W_{PIX})$. The sensing units $CS_1 \sim CS_M$ sense the energy of the light focused by the lens $LEN_1$ according to the shutter pulse signal $S_{ST}$. More particularly, when the shutter pulse signal $S_{ST}$ represents "turning-on", the sensing units $CS_1 \sim CS_M$ sense the energy of the light (for example, the background light $L_B$ or the reflecting light $L_{RD}$) focused by the lens $LEN_1$ so as to generate the light-sensed signal; when the shutter pulse signal $S_{ST}$ represents "turning-off", the sensing units $CS_1 \sim CS_M$ do not sense the energy of the light focused by the lens $LEN_1$. For example, when the shutter pulse signal $S_{ST}$ represents "turning-on", the sensing unit $CS_1$ senses the energy of the light focused by the lens $LEN_1$ so as to generate the light-sensed signal $S_{LS1}$, the sensing unit $CS_2$ senses the energy of the light focused by the lens $LEN_1$ so as to generate the light-sensed signal $S_{LS2}$, . . . , and the sensing unit $CS_M$ senses the energy of the light focused by the lens $LEN_1$ so as to generate the light-sensed signal $S_{LSM}$. In addition, when the reading signal $S_{RE}$ represents "reading", the sensing units $CS_1 \sim CS_M$ output the light-sensed signal $S_{LS1} \sim S_{LSM}$, respectively.

The distance-calculating circuit 140 includes a plurality of storing units for respectively storing the light-sensed signals $S_{LS1} \sim S_{LSM}$ outputted by the sensing units $CS_1 \sim CS_M$. The distance-calculating circuit 140 sets the attributes of the received light-sensed signals according to the phase signal $S_P$. In the present embodiment, the distance-calculating circuit 140 is illustrated to include M storing units $M_1 \sim M_M$ for example. When the phase signal Sp represents "sum", the storing units $M_1 \sim M_M$ set the attributes of the received light-sensed signals positive. That is, the received light-sensed signals $S_{LS1} \sim S_{LSM}$ are marked as positive light-sensed signals $S_{LS1+} \sim S_{LSM+}$ according to the phase signal $S_P$ representing "sum". When the phase signal $S_P$ represents "noise", the storing units $M_1 \sim M_M$ set the attributes of the received light-sensed signals negative. That is, the received light-sensed signals $S_{LS1} \sim S_{LSM}$ are marked as negative light-sensed signals $S_{LS1-} \sim S_{LSM-}$ according to the phase signal $S_P$ representing "noise". The distance-calculating circuit 140 calculates the measured distance $D_M$ according to the positive light-sensed signals $S_{LS1+} \sim S_{LSM+}$ and the negative light-sensed signals $S_{LS1-} \sim S_{LSM-}$. The operation principle of the distance-calculating circuit 140 calculating the measured distance $D_M$ is illustrated as below.

As shown in the left part of FIG. 2, during the distance-sensing phase, the lighting/sensing controlling circuit 110 generates the lighting pulse signal $S_{LD}$ represents "lighting" for the light emitting device 120 emitting the detecting light $L_{ID}$ to the measured object MO, so that the measured object MO generates the reflecting light $L_{RD}$. Meanwhile, the lighting/sensing controlling circuit 110 generates the shutter pulse signal $S_{ST}$ representing "turning-on" for the sensing units $CS_1 \sim CS_M$ sensing the energy of the reflecting light $L_{RD}$ and the background light $L_B$, so that the sensing units $CS_1 \sim CS_M$ generate the light-sensed signals $S_{LS1} \sim S_{LSM}$ respectively. Then the lighting/sensing controlling circuit 110 outputs the reading signal $S_{RE}$ representing "reading" for the image sensor 130 outputting the light-sensed signals $S_{LS1} \sim S_{LSM}$ to the distance-calculating circuit 140, and the lighting/sensing controlling circuit 110 generates the phase signal $S_P$ representing "sum" for indicating the distance-calculating circuit 140 that the received light-sensed signals are the light-sensed signals of the distance-sensing phase. That is, the received light-sensed signals of the distance-calculating circuit 140 at the time are the positive light-sensed signals $S_{LS1+} \sim S_{LSM+}$. It is assumed that the reflecting light $L_{RD}$ is mainly focused on the sensing unit $CS_K$ during the distance-sensing phase (as shown in FIG. 2). The values of the received positive light-sensed signals $S_{LS1+} \sim S_{LSM+}$ are shown in the right upper part of FIG. 2. The sensing unit $CS_K$ senses the background light $L_B$ and the reflecting light $L_{RD}$ (that is, the measured object MO images on the sensing unit $CS_K$). Therefore, the light-sensed signal $S_{LSK+}$ is equal to the sum of the energy $B_K$, which is accumulated by the sensing unit $CS_K$ sensing the background light $L_B$, and the energy $R_K$, which is accumulated by the sensing unit $CS_K$ sensing the reflecting light $L_{RD}$. The other sensing units only receive the background light $L_B$. For example, the light-sensed signal $S_{LS1+}$ is equal to the energy $B_1$, which is accumulated by the sensing unit $CS_1$ sensing the background light $L_B$; the light-sensed signal $S_{LS2+}$ is equal to the energy $B_2$, which is accumulated by the sensing unit $CS_2$ sensing the background light $L_B$; . . . ; the light-sensed signal $S_{LSM+}$ is equal to the energy $B_M$, which is accumulated by the sensing unit $CS_M$ sensing the background light $L_B$.

As shown in the left part of FIG. 2, during the noise-sensing phase, the lighting/sensing controlling circuit 110 generates the shutter pulse signal $S_{ST}$ representing "turning-on" for the sensing units $CS_1 \sim CS_M$ sensing the energy of the light focused by the lens $LEN_1$ so as to generate the light-sensed signals $S_{LS1} \sim S_{LSM}$. Meanwhile, the lighting/sensing controlling circuit 110 generates the lighting pulse signal $S_{LD}$ represents "not-lighting". Hence, the light emitting device 120 does not emit the detecting light $L_{ID}$ to the measured object MO, so that the measured object MO does not generate the reflecting light $L_{RD}$. Then the lighting/sensing controlling circuit 110 outputs the reading signal $S_{RE}$ representing "reading" for the image sensor 130 outputting the light-sensed signals $S_{LS1} \sim S_{LSM}$ to the distance-calculating circuit 140, and the lighting/sensing controlling circuit 110 generates the phase signal $S_P$ representing "noise" for indicating the distance-calculating circuit 140 that the received light-sensed signals are the light-sensed signals of the noise-sensing phase at the time. That is, the received light-sensed signals of the distance-calculating circuit 140 are the negative light-sensed signals $S_{LS1-} \sim S_{LSM-}$. The values of the received positive light-sensed signals $S_{LS1-} \sim S_{LSM-}$ are shown in the right lower part of FIG. 2. The pulse width of shutter pulse signal $S_{ST}$ during the distance-sensing phase is equal to the pulse width of shutter pulse signal $S_{ST}$ during the noise-sensing phase (both are equal to $T_C$). Therefore, the parts, which corresponds to the background light $L_B$, of the light-sensed signals $S_{LS1} \sim S_{LSM}$ of the distance-sensing phase are equal to the parts, which corresponds to the background light $L_B$, of the light-sensed signals $S_{LS1} \sim S_{LSM}$ of the noise-sensing phase. In other words, the parts contributed by the background light $L_B$ of the positive light-sensed signals $S_{LS1+} \sim S_{LSM+}$ are equal to the parts contributed by the background light $L_B$ of the negative light-sensed signals $S_{LS1-} \sim S_{LSM-}$ (both are equal to $B_1 \sim B_M$).

After the distance-sensing phase and the noise-sensing phase, the lighting/sensing controlling circuit 110 generates the phase signal $S_P$ representing "distance-calculating". Meanwhile, the distance-calculating circuit 140 deducts the negative light-sensed signals $S_{LS1-} \sim S_{LSM-}$ stored in the storing units from the positive light-sensed signals $S_{LS1+} \sim S_{LSM+}$ stored in the storing units. The distance-calculating circuit 140 finds out the storing unit(s) having the maximum stored value after the deduction and accordingly determines the imaging location of the reflecting light $L_{RD}$ on the image sensor 130. More particularly, the values of the storing units $M_1 \sim M_M$ of the distance-calculating circuit 140 are respectively equal to the values of the negative light-sensed signals $S_{LS1-} \sim S_{LSM-}$ deducting from the positive light-sensed signals $S_{LS1+} \sim S_{LSM+}$. For instance, the storing unit $M_1$ stores the value of the negative light-sensed signal $S_{LS1-}$ deducting from the positive light-sensed signal $S_{LS1+}$. Since the positive light-sensed signal $S_{LS1+}$ and the negative light-sensed signal $S_{LS1-}$ are both equal to $B_1$, the stored value of the storing unit $M_1$ after the deduction is equal to zero. The storing unit $M_2$ stores the value of the negative light-sensed signal $S_{LS2-}$ deducting from the positive light-sensed signal $S_{LS2+}$. Since the positive light-sensed signal $S_{LS2+}$ and the negative light-sensed signal $S_{LS2-}$ are both equal to $B_2$, the stored value of the storing unit $M_2$ after the deduction is equal to zero. Similarly, the storing unit $M_K$ stores the value of the negative light-sensed signal $S_{LSK-}$ deducting from the positive light-sensed signal $S_{LSK+}$. Since the positive light-sensed signal $S_{LSK+}$ is equal to $(R_K+B_K)$ and the negative light-sensed signal $S_{LSK-}$ is equal to $B_K$, the stored value of the storing unit $M_K$ after the deduction is equal to $R_K$. The storing unit $M_M$ stores the value of the negative light-sensed signal $S_{LSM-}$ deducting from the positive light-sensed signal $S_{LSM+}$. Since the positive light-sensed signal $S_{LSM+}$ and the negative light-sensed signal $S_{LSM-}$ are both equal to $B_M$, the stored value of the storing unit $M_M$ after the deduction is equal to zero. In other words, among the storing units $M_1 \sim M_M$, the stored value of the storing unit $M_K$ is equal to $R_K$, and the stored value of the other sensing units are all equal to zero. Consequently, the distance-calculating circuit 140 determines the positive light-sensed signal stored in the storing unit $M_K$ has the energy corresponding to the reflecting light $L_{RD}$. Since the storing unit $M_K$ stores the light-sensed signal generated by the sensing unit $CS_K$, the distance-calculating circuit 140 determines the reflecting light $L_{RD}$ generated by the measured object MO is mainly focused on the sensing unit $CS_K$. In this way, the distance-calculating circuit 140 calculates the imaging location $D_{CS}$ of the reflecting light $L_{RD}$ of FIG. 1 according to the sensing unit $CS_K$ and the following formula:

$$D_{CS} = K \times W_{PIX} \quad (1);$$

In addition, since, in FIG. 1, the straight light $L_F$ formed between the focus point $O_{F1}$ of the lens $LEN_1$ and the sensing unit $CS_1$ is parallel to the detecting light $L_{ID}$, the included angle $\theta_1$ between the detecting light $L_{ID}$ and the reflecting light $L_{RD}$ is equal to the included angle $\theta_2$ between the straight line $L_F$ and the reflecting light $L_{RD}$. In other words, the relation between $\tan \theta_1$ and $\tan \theta_2$ is represented as the following formula:

$$\tan \theta_1 = L/D_M = \tan \theta_2 = D_{CS}/D_F \quad (2);$$

wherein L represents the predetermined distance between the light emitting device 120 and the image sensor 130 (or between the detecting light $L_{ID}$ and the straight light $L_F$); $D_{CS}$ represents the imaging location of the reflecting light $L_{RD}$; $D_F$ represent the focus length of the lens $LEN_1$. The measured distance $D_M$ is represented as the following formula according to the formula (2):

$$D_M = (D_F \times L)/D_{CS} \quad (3);$$

as a result, the distance-calculating circuit 140 calculates the imaging location $D_{CS}$ according to the formula (1), and then calculates the measured distance $D_M$ according to the predetermined distance L, the focus length $D_F$, and the formula (3).

In conclusion, in the distance-measuring device 100, during the distance-sensing phase, the lighting/sensing controlling circuit 110 controls the light emitting device 120 to emit the detecting light $L_{ID}$ to the measured object MO. The storing units $M_1 \sim M_M$ store the positive light-sensed signals $S_{LS1+} \sim S_{LSM+}$ generated by the sensing unit $CS_1 \sim CS_M$ sensing the light (for instance, the reflecting light $L_{RD}$ and the background light $L_B$) focused by the lens $LEN_1$. During the noise-sensing phase, the lighting/sensing controlling circuit 110 controls the light emitting device 120 not to emit the detecting light $L_{ID}$ to the measured object MO. The storing units $M_1 \sim M_M$ store the negative light-sensed signals $S_{LS1-} \sim S_{LSM-}$ generated by the sensing unit $CS_1 \sim CS_M$ sensing the light (for instance, the background light $L_B$) focused by the lens $LEN_1$. Then the stored values of the storing units $M_1 \sim M_M$ are equal to the values of the negative light-sensed signals $S_{LS1-} \sim S_{LSM-}$ deducting from the positive light-sensed signals $S_{LS1+} \sim S_{LSM+}$. Thus, the stored value of the storing unit $M_K$, corresponding to the sensing unit $CS_K$ where the reflecting light $L_{RD}$ is focused, is larger than the other storing units. In this way, the distance-calculating circuit 140 determines the reflecting light $L_{RD}$ is focused to the sensing unit $CS_K$, and accordingly calculates the imaging location $D_{CS}$ of the reflecting light $L_{RD}$. Therefore, the distance-calculating circuit 140 can calculate the measured distance $D_M$ according to the imaging location $D_{CS}$, the focus length $D_F$ of the lens $LEN_1$, and the predetermined distance L.

Furthermore, in the distance-measuring device 100, the distance-sensing phase and the noise-sensing phase can repeat over and over (for example, Y times), so that the storing units $M_1$~$M_M$ store the positive light-sensed signals corresponding to the Y distance-sensing phases, and store the negative light-sensed signals corresponding to the Y noise-sensing phases. The parts of the positive light-sensed signals, which corresponds to the background light $L_B$ during each distance-sensing phase, are counteracted by the parts of the negative light-sensed signals, which corresponds to the background light $L_B$ during each noise-sensing phase. Hence, besides the value of the storing unit $M_K$, corresponding to the sensing unit $CS_K$ where the reflecting light $L_{RD}$ is focused, is equal to ($Y \times R_K$), the values of the other storing units are all equal to zero. In this way, even the reflecting light $L_{RD}$ is so weak that the energy $R_K$ sensed by the sensing unit $CS_K$ is very small, the distance-measuring device 100 still can enlarge the difference between the value of the storing unit $M_K$ and the values of the other storing units by repeating the distance-sensing phase and the noise-sensing phase for several times (that is, Y is enlarged). In this way, in spite of the weak reflecting light $L_{RD}$, the distance-calculating circuit 140 still can correctly determine the storing unit $M_K$ having the maximum value, and accordingly calculates the imaging location $D_{CS}$ of the reflecting light $L_{RD}$.

Figure 3:
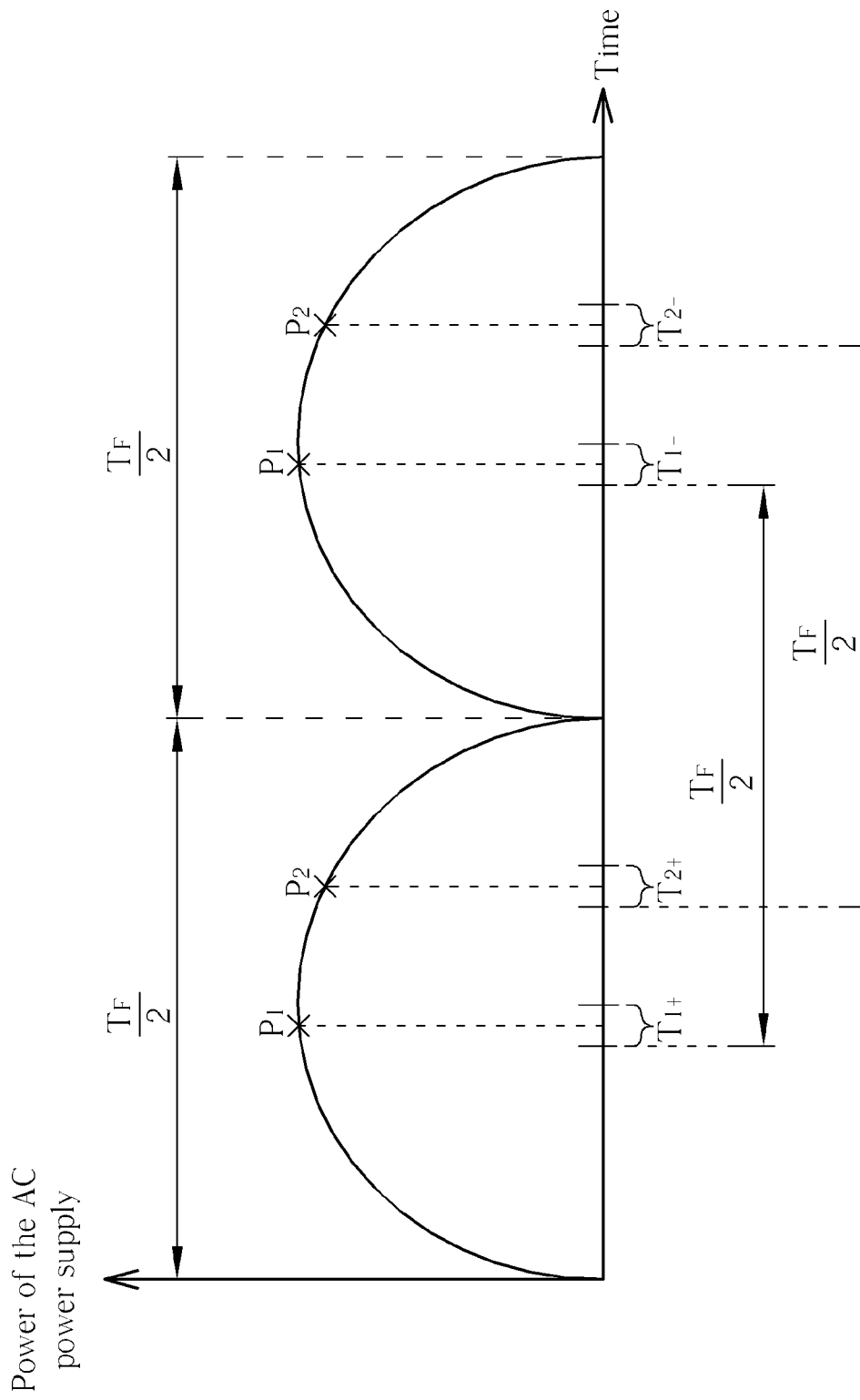
FIG. 3 is a diagram illustrating the operation principle of the distance-measuring device reducing the flicker phenomenon according to the present invention.

Please refer to FIG. 3. FIG. 3 is a diagram illustrating the operation principle of the distance-measuring device 100 reducing the flicker phenomenon. Since the power of the general indoor light sources are from the AC power supply, a part of the background light $L_B$ (which is referred as the flicking light $L_F$ hereinafter) flicks because of the frequency of the AC power supply. For example, the power of the indoor fluorescent lamp is from the AC power supply. Therefore, the light emitted by the fluorescent lamp is affected by the frequency of the AC power supply, so that the flicker phenomenon is generated. In FIG. 3, it is assumed that the cycle of the AC power supply (or the AC cycle) is $T_F$ (for example, the frequency of the AC power supply is 60 Hz, and the AC cycle is 0.0167 s). The power P of the AC power supply varies with time. Hence, the power of the flicking light $L_F$ varies as well. However, the varying cycle of the power P of the AC power supply is equal to a half of the AC cycle (that is, $T_F/2$). For example, when the time is T, the power P of the AC power supply is equal to $P_T$; when the time is $(T+T_F/2)$, the power P of the AC power supply is still equal to $P_T$. Since the power of the flicking light is proportional to the power P of the AC power supply, the varying cycle of the power of the flicking light $L_F$ is equal to a half of the AC cycle (that is, $T_F/2$) as well. In this way, in the distance-measuring device 100, the lighting/sensing controlling circuit 110 controls the time interval between the distance-sensing phases (for example, $T_{1+}$ and $T_{2+}$ shown in FIG. 3) and the noise-sensing phases (for example, $T_{1-}$ and $T_{2-}$ shown in FIG. 3) equal to a half of the AC cycle $T_F/2$ for reducing the effect of the flicker phenomenon. More particularly, the lighting/sensing controlling circuit 110 controls the sensing units $CS_1$~$CS_M$ sensing the flicking light $L_F$ corresponding to the power $P_1$ (or $P_2$) of the AC power supply during the distance-sensing phase $T_{1+}$ (or $T_{2+}$), so that the parts of the positive light-sensed signals, which correspond to the flicking light $L_F$, are equal to $F_{11}$~$F_{M1}$ (or $F_{12}$~$F_{m2}$). The lighting/sensing controlling circuit 110 controls the time interval between the distance-sensing phase $T_{1+}$ (or $T_{2+}$) and the noise-sensing phase $T_{1-}$ (or $T_2$) equal to a half of the AC cycle $T_F/2$ (for example, 0.0083 s). As a result, the power of the flicking light $L_F$ sensed by the sensing units $CS_1$~$CS_M$ during the noise-sensing phase $T_{1-}$ (or $T_2$) is equal to the power of the flicking light $L_F$ sensed by the sensing units $CS_1$~$CS_M$ during the distance-sensing phase $T_{1+}$ (or $T_{2+}$). In this way, the parts, corresponding to the flicking light $L_F$, of the negative light-sensed signals generated by the sensing units $CS_1$~$CS_M$ during the noise-sensing phase $T_{1-}$ (or $T_2$) are equal to $F_{11}$~$F_{m1}$ (or $F_{12}$~$F_{m2}$) as well. Consequently, the parts, corresponding to the flicking light $L_F$, of the positive light-sensed signals of the distance-sensing phase $T_{1+}$ (or $T_{2+}$) are counteracted by the parts, corresponding to the flicking light $L_F$, of the negative light-sensed signals of the noise-sensing phase $T_{1-}$ (or $T_{2-}$). In other words, besides the value of the storing unit $M_K$, which corresponds to the sensing unit $CS_K$ where the reflecting light $L_{RD}$ is focused, is equal to $R_K$, the values of the other storing units are all equal to zero. Hence, even the sensing units $CS_1$~$CS_M$ sense the flicking light $L_F$, the lighting/sensing controlling circuit 110 still can reduce the effect of the flicker phenomenon by controlling the time interval between the distance-sensing phase and the noise-sensing phase equal to a half of the AC cycle $(T_F/2)$, so that the distance-calculating circuit 140 correctly determines the imaging location $D_{CS}$ of the reflecting light $L_{RD}$ and accordingly calculates the measured distance $D_M$.

Since, when the distance-measuring device 100 is assembled during the fabrication, the locations of the components of the distance-measuring device 100 are affected by the assembling error, the distance-measuring device 100 is affected by the assembling error when the distance-measuring device 100 measures the distance. In the present invention, the parameter-calculating circuit 150 of the distance-measuring device 100 is utilized for calibrating the assembling error of the distance-measuring device 100. The operation principle of the parameter-calculating circuit 150 is illustrated as below.

The parameter-calculating circuit 150 receives the known-distance signal $S_D$ for obtaining a known distance $D_{C1}$ and a known distance $D_{c2}$, wherein the known distance $D_{C1}$ is the distance between a calibrating object $CO_1$ and the distance-measuring device 100, and the known distance $D_{C2}$ is the distance between a calibrating object $CO_2$ and the distance-measuring device 100. By means of the method illustrated in FIG. 2, the light emitting device 120 is controlled to emit the detecting light $L_{ID}$ to the calibrating objects $CO_1$ and $CO_2$, so that the parameter-calculating circuit 150 can obtain the imaging location of the reflecting light $L_{RD}$ according to the light-sensed signals outputted by the images sensor 130 and accordingly calibrates the assembling error of the distance-measuring device 100.

First, it is assumed that the detecting light $L_{ID}$ emitted by the light emitting device 120 rotates a lighting-error angle $\theta_{LD}$ because of the assembling error.

Figure 4:
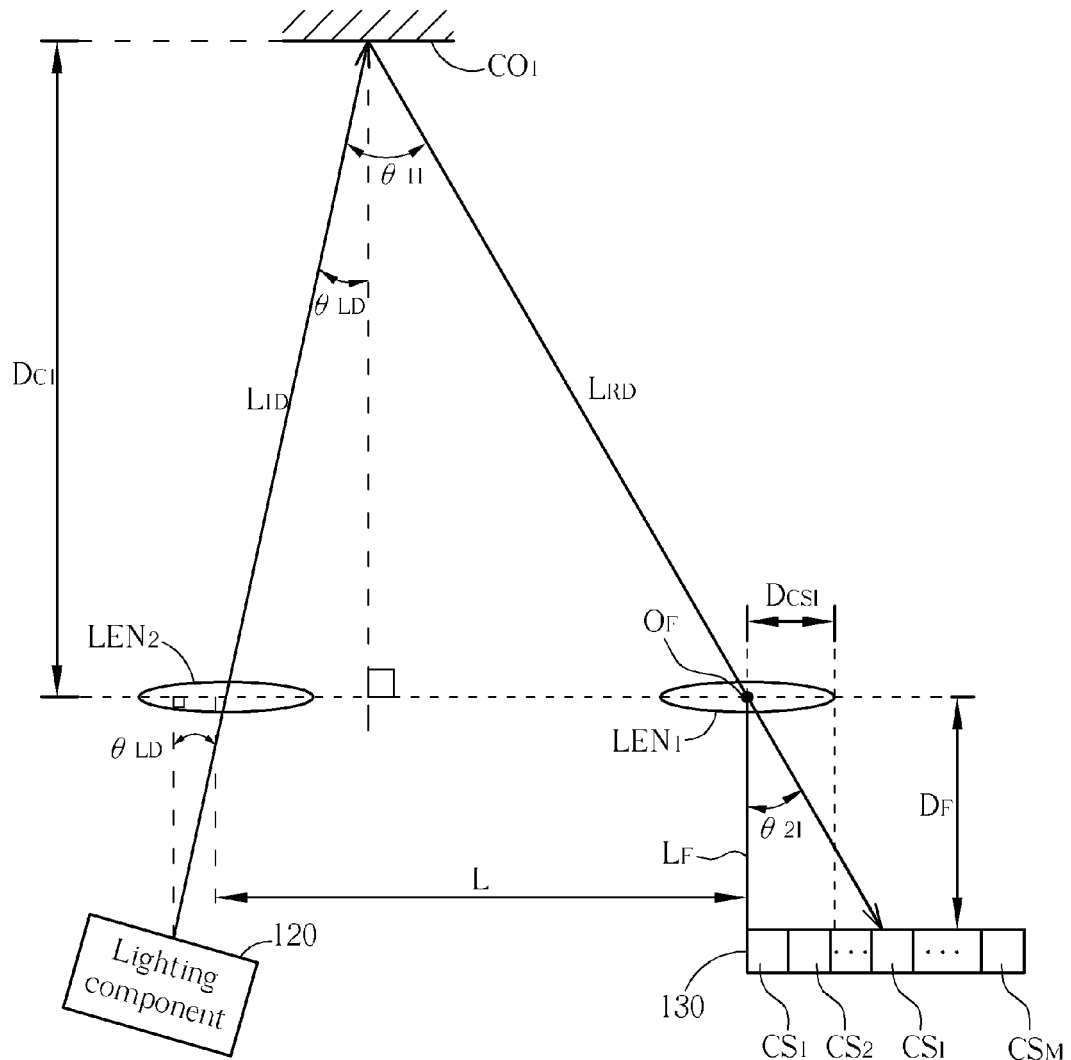
FIG. 4 is a diagram illustrating a calibrating method of calibrating the lighting-error angle of the detecting light emitted by the lighting-component.

Please refer to FIG. 4. FIG. 4 is a diagram illustrating a calibrating method of calibrating the lighting-error angle $\theta_{LD}$ of the detecting light $L_{ID}$ emitted by the lighting-component 120. The lighting/sensing controlling circuit 110 controls the light emitting device 120 to emit the detecting light $L_{ID}$ to the calibrating object $CO_1$. The distance between the calibrating object $CO_1$ and the distance-measuring device 100 is the known distance $D_{C1}$. Since the detecting light $L_{ID}$ is affected by the assembling error of the light emitting device 120, the detecting light $L_{ID}$ emits to the calibrating object $CO_1$ with a lighting-error angle $\theta_{LD}$, and the reflecting light $L_{RD}$ generated by the calibrating object $CO_1$ reflecting the detecting light $L_{ID}$ is focused to the sensing unit $CS_1$. The included angle between the detecting light $L_{ID}$ and the reflecting light $L_{RD}$ is $\theta_{1I}$. The included angle between the straight line $L_F$ and the reflecting light $L_{RD}$ is $\theta_{2I}$. As shown in FIG. 4, since the straight light $L_F$ is parallel to the surface normal of the calibrating object $CO_1$, $(\theta_{1I} - \theta_{LD})$ is equal to $\theta_{2I}$. That is, $\tan(\theta_{1I} - O_{LD})$ is equal to $\tan \theta_{2I}$. Therefore, the following formulas are obtained:

$$D_{C1} = 1/[1/(D_F \times L) \times D_{CSI} + B] \quad (4);$$

$$B = \tan \theta_{LD}/L \quad (5);$$

wherein B represents the calibrating parameter for calibrating the lighting-error angle $\theta_{LD}$; $D_{CSI}$ represents the imaging location of the reflecting light $L_{RD}$. Thus, the parameter-calculating circuit 150 calculates the calibrating parameter B according to the formula (4). In this way, the parameter-calculating circuit 150 outputs the calibrating parameter B to the distance-calculating circuit 140 through the parameter signal $S_{AB}$, so that the distance-calculating circuit 140 calibrates the formula (2) to be the following formula for calculating the calibrated measured distance $D_M$:

$$D_M = 1/[1/(D_F \times L) \times D_{CS} + B] \quad (6);$$

as a result, even the detecting light $L_{ID}$ emitted by the light emitting device 120 rotates a lighting-error angle $\theta_{LD}$ because of the assembling-error, the distance-calculating circuit 140 still can correctly calculate the measured distance $D_M$, according to the calibrating parameter B, the focus length $D_F$ of the lens $LEN_1$, the predetermined distance L, and the imaging location $D_{CS}$ of the reflecting light $L_{RD}$ when the measured object MO is measured, by means of the parameter-calculating circuit 150 calculating the calibrating parameter B capable of calibrating the lighting-error angle $\theta_{LD}$.

Figure 5:
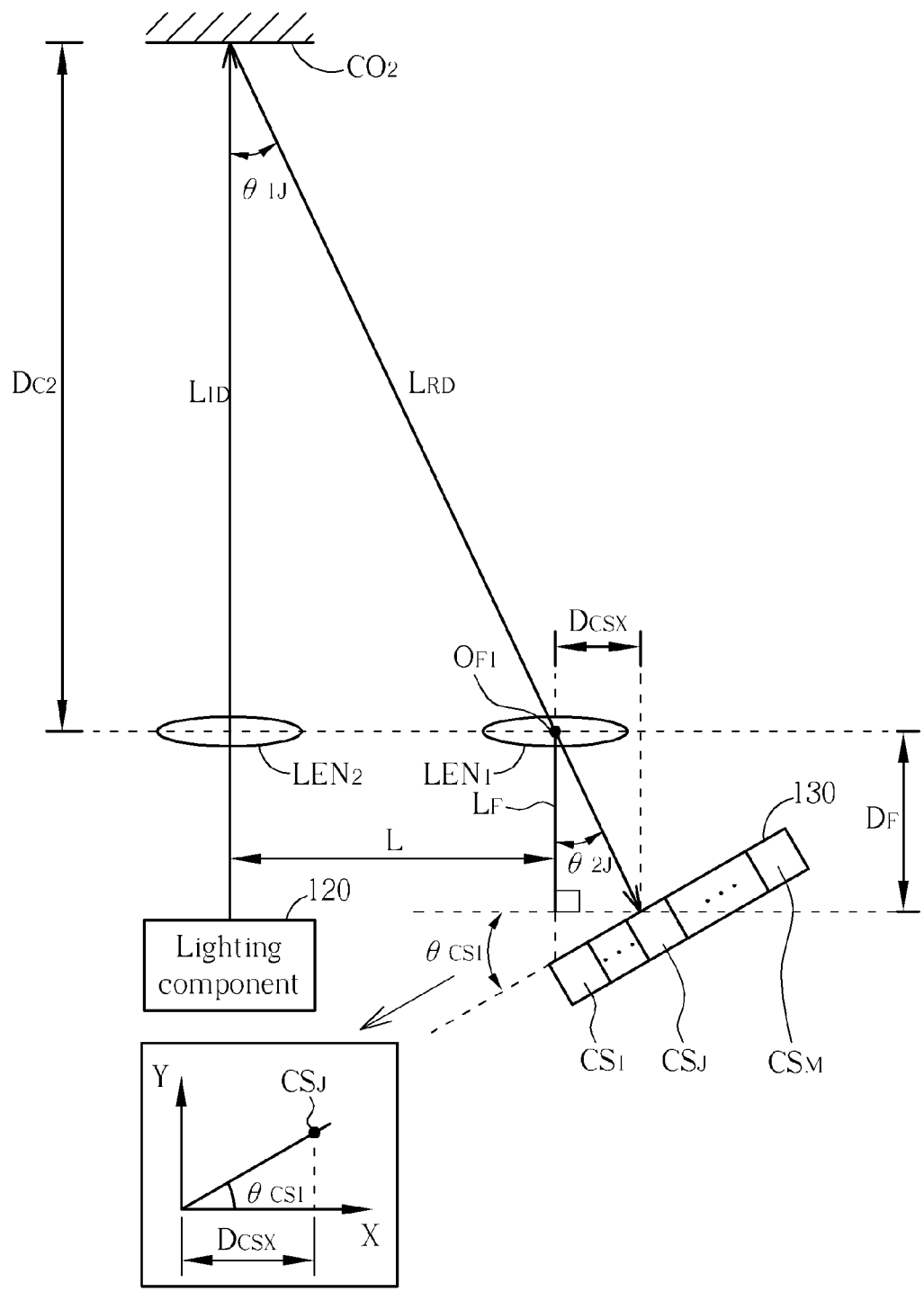
FIG. 5 and FIG. 6 are diagrams illustrating a calibrating method of calibrating sensing-error angles rotated by the image sensor because of the assembling error.
Figure 6:
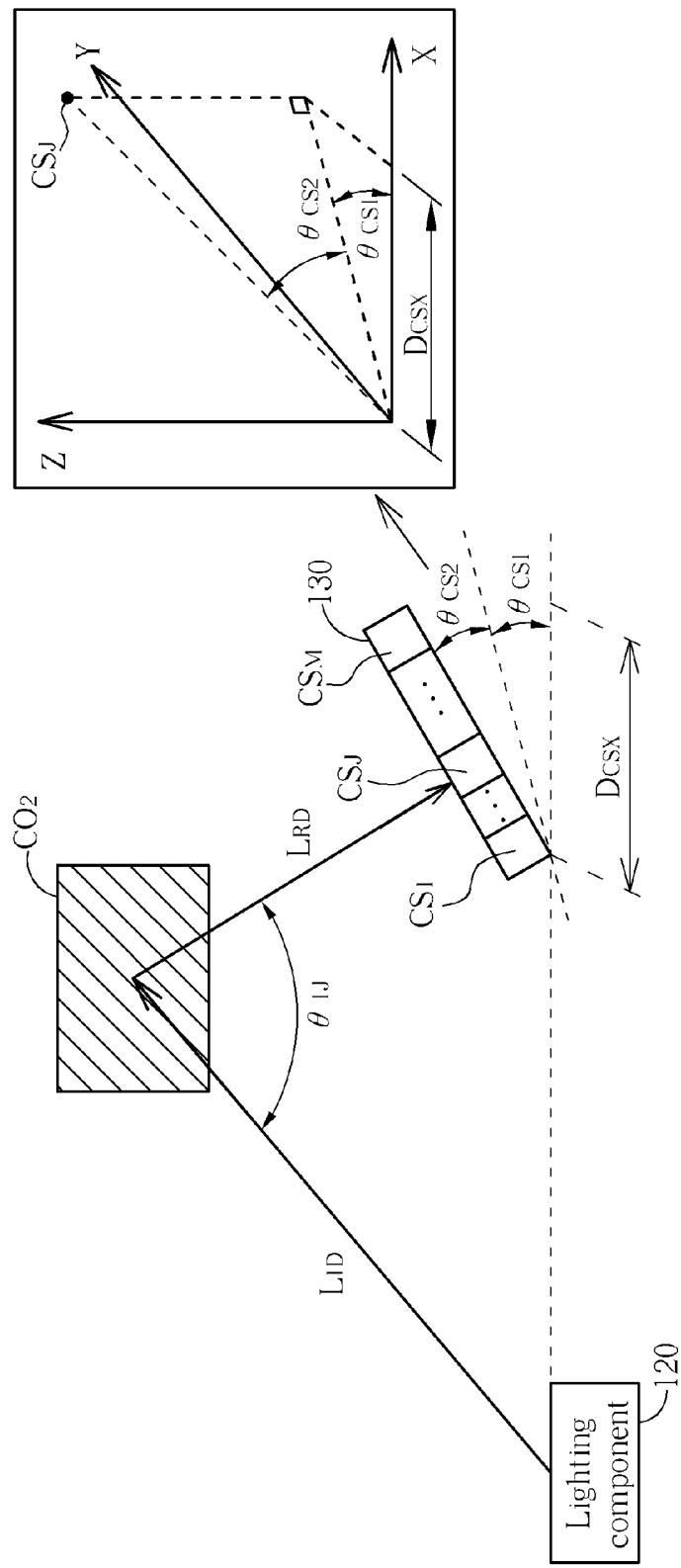

Please refer to FIG. 5 and FIG. 6. FIG. 5 and FIG. 6 are diagrams illustrating a calibrating method of calibrating sensing-error angles $\theta_{CS1}$ and $\theta_{CS2}$ rotated by the image sensor 130 because of the assembling error. FIG. 5 is a top view diagram of the distance-measuring device 100. As shown in FIG. 5, the sensing-error angle $\theta_{CS1}$ is on the XY plane. FIG. 6 is a side view diagram of the distance-measuring device 100. In addition, the sensing-error angles $\theta_{CS1}$ and $\theta_{CS2}$ are both shown in FIG. 6. The lighting/sensing controlling circuit 110 controls the light emitting device 120 to emit the detecting light $L_{ID}$ to the calibrating object $CO_2$. The distance between the calibrating object $CO_2$ and the distance-measuring device 100 is the known distance $D_{c2}$. In FIG. 5 and FIG. 6, it is assumed that the light emitting device 120 is assembled correctly (that is, the lighting-error angle $\theta_{LD}$ is zero). The detecting light $L_{ID}$ emits to the calibrating object $CO_2$, and the reflecting light $L_{RD}$ generated by the calibrating object $CO_2$ reflecting the detecting light $L_{ID}$ is focused to the sensing unit $CS_J$. The included angle between the detecting light $L_{ID}$ and the reflecting light $L_{RD}$ is $\theta_{1J}$. The included angle between the straight line $L_F$ and the reflecting light $L_{RD}$ is $\theta_{2J}$. It can be seen in FIG. 6 that $D_{CSX}$ is a projected distance projected by the imaging location $D_{CSJ}$ of the reflecting light $L_{RD}$, and the relation between the imaging location $D_{CSJ}$ and the projected distance $D_{CSX}$ is represented as the following formula:

$$D_{CSX} = D_{CSJ} \times \cos \theta_{CS2} \times \cos \theta_{CS1} \quad (6).$$

In FIG. 5, the straight line LF is parallel to the detecting light $L_{ID}$. Consequently, the included angle $\theta_{2J}$ between the straight line $L_F$ and the reflecting light $L_{RD}$ is equal to the included angle $\theta_{1J}$ between the detecting light $L_{ID}$ and the reflecting light $L_{RD}$. That is, $\tan \theta_{1J}$ is equal to $\tan \theta_{2J}$. In this way, the relation between the known distance $D_{C2}$ and the projected distance $D_{CSX}$ is represented as the following formula:

$$L/D_{CSX} = D_{CSX}/D_F \quad (7);$$

hence, the following formulas are obtained according to the formulas (6) and (7):

$$D_{C2} = 1/(A \times D_{CSJ}) \quad (8);$$

$$A = (\cos \theta_{CS2} \times \cos \theta_{CS1})/(D_F \times L) \quad (9);$$

wherein A represents the calibrating parameter for calibrating the sensing-error angles $\theta_{CS2}$ and $\theta_{CS1}$. Thus, the parameter-calculating circuit 150 calculates the calibrating parameter A according to the formula (8). In this way, the parameter-calculating circuit 150 outputs the calibrating parameter A to the distance-calculating circuit 140 through the parameter signal $S_{AB}$, so that the distance-calculating circuit 140 calibrates the formula (2) to be the following formula for calculating the calculated measured distance $D_M$:

$$D_M = 1/(A \times D_{CS}) \quad (10);$$

it can be seen that even the image sensor 130 rotates the sensing-error angles $\theta_{CS1}$ and $\theta_{CS2}$ because of the assembling error, the distance-calculating circuit 140 still can correctly calculate the measured distance $D_M$, according to the calibrating parameter A, and the imaging location $D_{CS}$ of the reflecting light $L_{RD}$ when the measured object MO is measured, by means of the parameter-calculating circuit 150 calculating out the calibrating parameter A capable of calibrating the sensing-error angles $\theta_{CS1}$ and $\theta_{CS2}$.

It is assumed that the detecting light $L_{ID}$ emitted by the light emitting device 120 rotates the lighting-error angle $\theta_{LD}$, and the image sensor 130 also rotates the sensing-error angles $\theta_{CS1}$ and $\theta_{CS2}$, because of the assembling error of the distance-measuring device 100. The distance-measuring device 100 can obtain the imaging location $D_{CS1}$ of the reflecting light $L_{RD}$ corresponding to the calibrating object $CO_1$ and the imaging location $D_{CS2}$ of the reflecting light $L_{RD}$ corresponding to the calibrating object $CO_2$ by the light emitting device 120 emitting the detecting light $L_{ID}$ to the calibrating objects $CO_1$ and $CO_2$, according to the illustration of FIG. 4, FIG. 5, and FIG. 6. The relations among the imaging locations $D_{CS1}$ and $D_{CS2}$, the known distance $D_{C1}$ between the distance-measuring device 100 and the calibrating object $CO_1$, the known distance $D_{c2}$ between the distance-measuring device 100 and the calibrating object $CO_2$, and the calibrating parameters A and B are represented as the following formulas:

$$D_{C1} = 1/[A \times D_{CS1} + B] \quad (11);$$

$$D_{C2} = 1/[A \times D_{CS2} + B] \quad (12);$$

the parameter-calculating circuit 150 calculates the calibrating parameter A capable of calibrating the sensing-error angles $\theta_{CS1}$ and $\theta_{CS2}$, and the calibrating parameter B capable of calibrating the lighting-error angles $\theta_{LD}$, according to the formulas (11) and (12). The parameter-calculating circuit 150 outputs the calibrating parameters A and B to the distance-calculating circuit 140 through the parameter signal $S_{AB}$, so that the distance-calculating circuit 140 calibrates the formula (2) to be the following formula for calculating the calculated measured distance $D_M$:

$$D_M = 1/[A \times D_{CS} + B] \quad (13);$$

in this way, even the detecting light $L_{ID}$ emitted by the light emitting device 120 rotates the lighting-error angle $\theta_{LD}$, and the image sensor 130 rotates the sensing-error angles $\theta_{CS1}$ and $\theta_{CS2}$ at the same time, the distance-calculating circuit 140 still can correctly calculate the measured distance $D_M$ by the parameter-calculating circuit 150 calculating out the calibrating parameter A, which is capable of calibrating the sensing-error angles $\theta_{CS1}$ and $\theta_{CS2}$, and the calibrating parameter B, which is capable of calibrating the lighting-error angle $\theta_{LD}$.

In addition, according to the formula (13), when the distance-calculating circuit 140 calculates the measured distance $D_M$, only the calibrating parameters A and B, and the imaging location $D_{CS}$ of the reflecting light $L_{RD}$ when the measured object MO is measured are required. The focus length $D_F$ of the lens $LEN_1$ and predetermined distance L do not have to be known. In other words, even the focus length $D_F$ of the lens $LEN_1$ and predetermined distance L are affected because of the assembling error during the fabrication, the distance-calculating circuit 140 still can correctly calculates the measured distance $D_M$ according to the formula (13).

Figure 7:
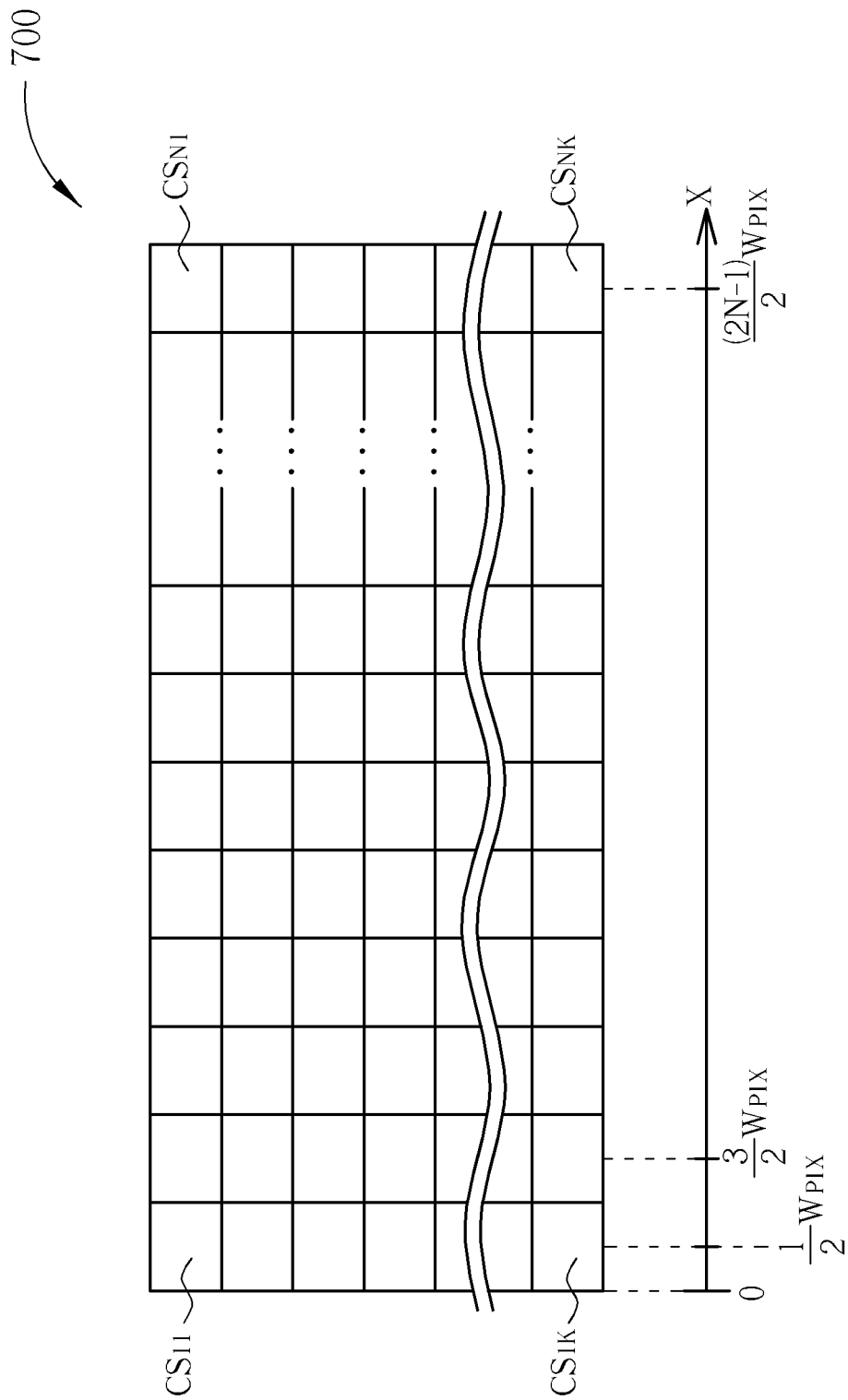
FIG. 7 is a diagram illustrating the structure of an image sensor according to a first embodiment of the present invention.

Please refer to FIG. 7. FIG. 7 is a diagram illustrating the structure of an image sensor 700 according to a first embodiment of the present invention. As shown in FIG. 7, the M sensing units of the image sensor 700 are arranged in N columns and K rows. In the image sensor 700, the horizontal locations (that is, the location in the horizontal direction or in the direction of the X-axis shown in FIG. 7) of the sensing units of the same column are the same. Moreover, it is assumed that the widths of the sensing units $CS_{11}$~$CS_{NK}$ are all equal to $W_{PIX}$ and the horizontal location of the left side of the sensing unit $CS_{11}$ is represented by zero. If the horizontal location of the sensing units of one column is represented by the center of the column, then the horizontal location of the sensing units $CS_{11}$~$CS_{1K}$ of the $1^{st}$ column is represented as $1/2 \times W_{PIX}$; the horizontal location of the sensing units $CS_{21}$~$CS_{2K}$ of the $2^{nd}$ column is represented as $3/2 \times W_{PIX}$; the horizontal location of the sensing units $CS_{N1}$~$CS_{NK}$ of the $N^{th}$ column is represented as $[(2 \times N-1) \times W_{PIX}]/2$, and so on. Therefore, in the image sensor 700, the horizontal locations of the sensing units of each row can be represented as $\{1/2 \times W_{PIX}, 3/2 \times W_{PIX}, \ldots, [(2 \times N-1) \times W_{PIX}]/2\}$, according to the above-mentioned illustration.

Figure 8:
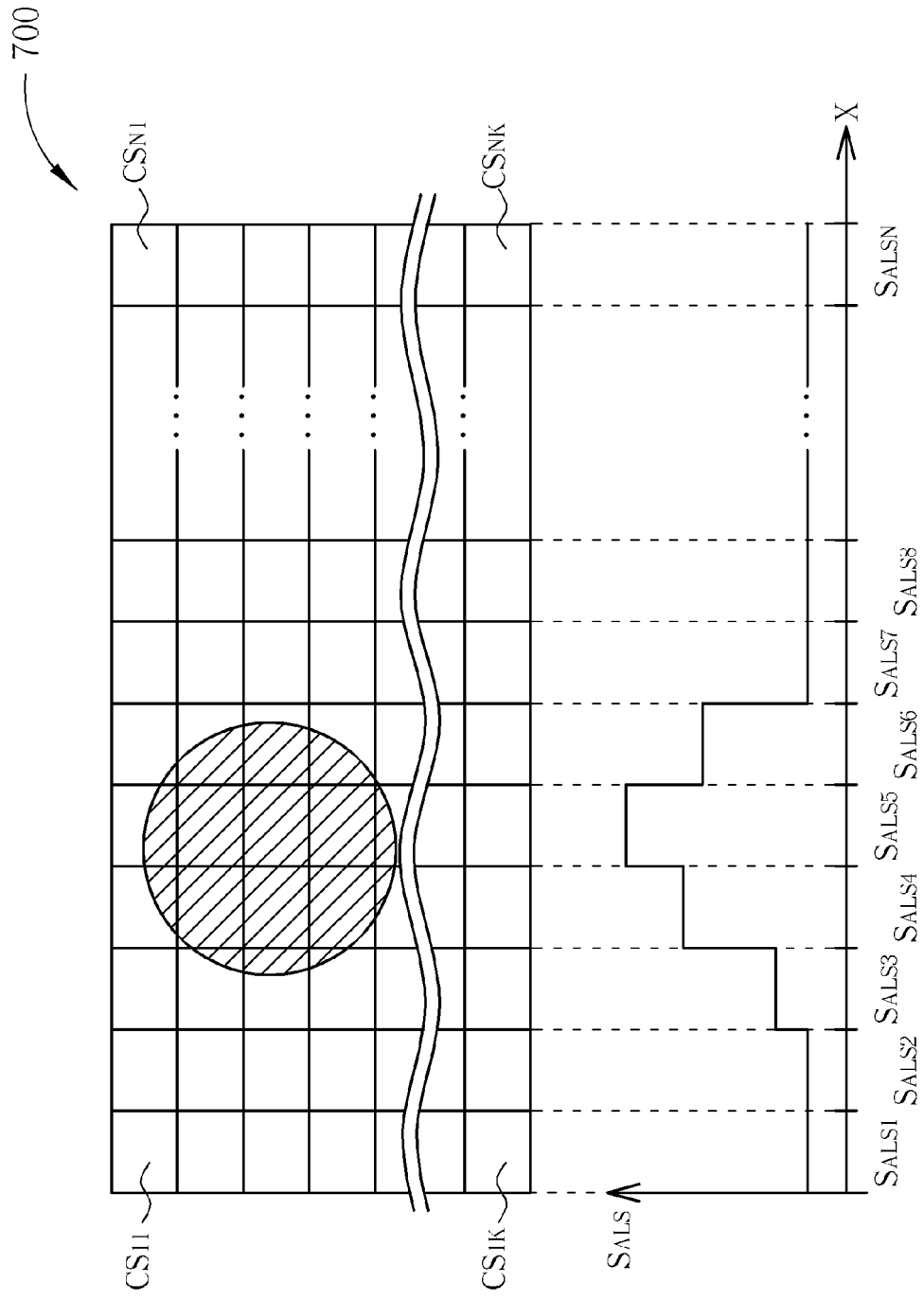
FIG. 8 is a diagram illustrating the operation principle of detecting the imaging location of the reflecting light by the image sensor of FIG. 7.

Please refer to FIG. 8. FIG. 8 is a diagram illustrating the operation principle of detecting the imaging location $D_{CS}$ of the reflecting light $L_{RD}$ by the image sensor 700. The circle shown in the upper part of FIG. 8 represents the imaging location $D_{CS}$ of the reflecting light $L_{RD}$ on the image sensor 700. That is, the sensing units inside the circle sense the energy of the reflecting light $L_{RD}$ so as to generate the light-sensed signals $S_{LS}$ having the larger values than the other sensing units. For obtaining the imaging location $D_{CS}$ of the reflecting light $D_{CS}$, the light-sensed signals $S_{LS}$ generated by sensing units of each column are respectively summed for obtaining the accumulated light-sensed signals $S_{ALS}$ for each column. For example, the accumulated light-sensed signal generated by summing the light-sensed signals of the sensing units $CS_{11}$~$CS_{1K}$ of the $1^{st}$ column is $S_{ALS1}$; the accumulated light-sensed signal generated by summing the light-sensed signals of the sensing units $CS_{21}$~$CS_{2K}$ of the $2^{nd}$ column is $S_{ALS2}$; the accumulated light-sensed signal generated by summing the light-sensed signals of the sensing units $CS_{N1}$~$CS_{NK}$ is of the $N^{th}$ column $S_{ALSN}$, and so on. Since the sensing units sensing the reflecting light $L_{RD}$ generate the light-sensed signals having the larger values, the sensing units near the imaging location $D_{CS}$ of the reflecting light $L_{RD}$ (that is, inside the circle) all generate the light-sensed signals having the larger values. In other words, among the accumulated light-sensed signals $S_{ALS1}$~$S_{ALS2N}$, if the accumulated light-sensed signal $S_{ALSF}$, which corresponds to the sensing units $CS_{F1}$~$CS_{FK}$ of the $F^{th}$ column, has the maximum value, it represents that the imaging location $D_{CS}$ of the reflecting light $L_{RD}$ (that is, the center of the circle) is at the $F^{th}$ column. In this way, the horizontal direction of the $F^{th}$ column is utilized for representing the imaging location $D_{CS}$ of the reflecting light $L_{RD}$. For instance, as shown in FIG. 8, the accumulated light-sensed signal $S_{ALS5}$ corresponding to the sensing units $CS_{51}$~$CS_{5K}$ of $5^{th}$ column has the maximum value. Therefore, the imaging location $D_{CS}$ of the reflecting light $L_{RD}$ (that is, the center of the circle) is determined at the $5^{th}$ column. In this way, the horizontal location of the $5^{th}$ column ($9/2 \times W_{PIX}$) can represent the imaging location $D_{CS}$ of the reflecting light $L_{RD}$.

Figure 9:
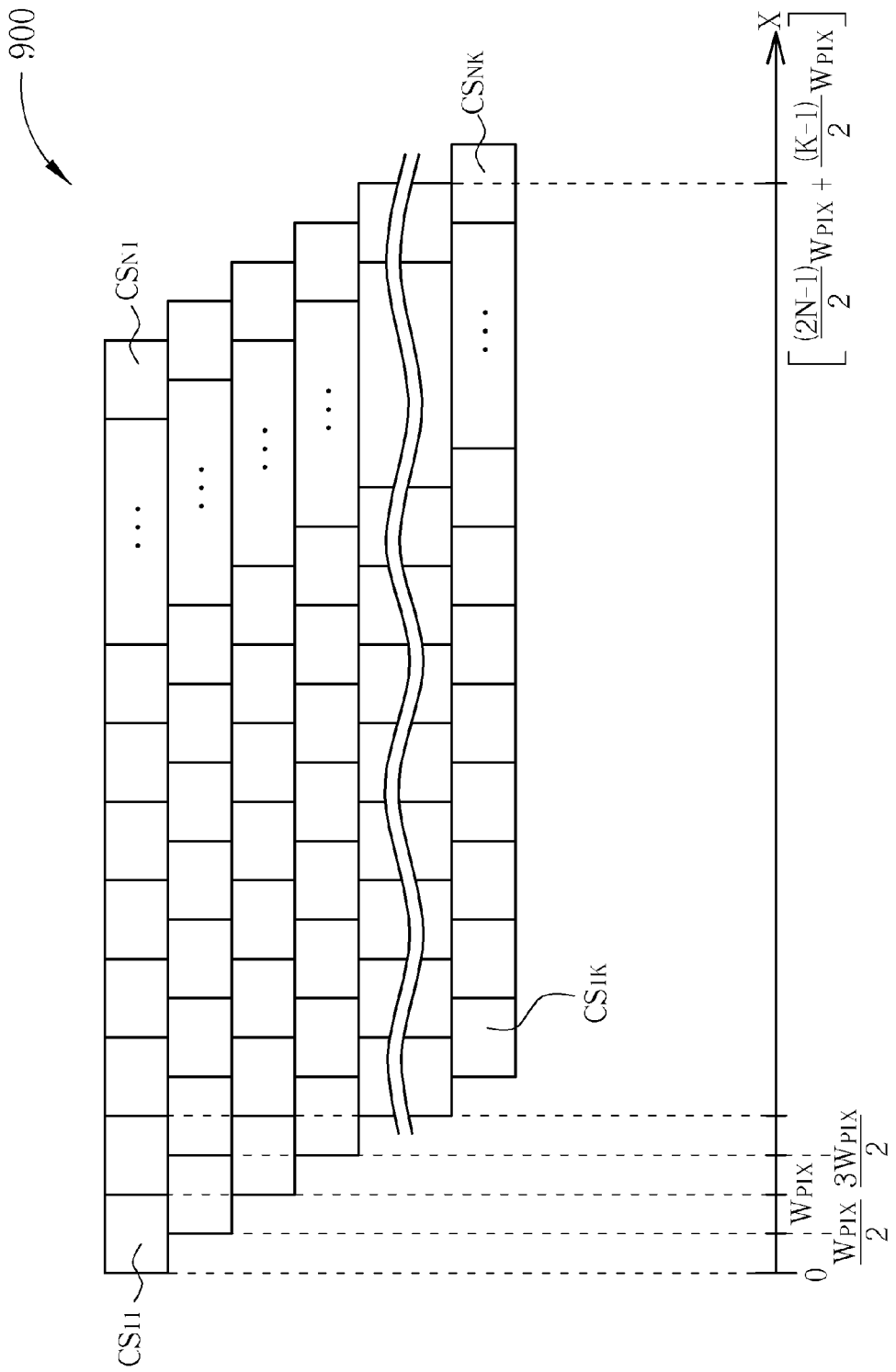
FIG. 9 is a diagram illustrating the structure of an image sensor according to another embodiment of the present invention.

Please refer to FIG. 9. FIG. 9 is a diagram illustrating the structure of an image sensor 900 according to another embodiment of the present invention. As shown in FIG. 9, the M sensing units of the image sensor 900 are arranged in N columns and K rows. Comparing with the image sensor 700, in the image sensor 900, the horizontal locations of each sensing unit of one row is shifted by a shifting distance $D_{SF}$, which is assumed to be $W_{PIX}/2$ in FIG. 9. For example, the horizontal locations of the sensing units $CS_{11}$~$CS_{N1}$ of the $1^{st}$ row can be represented as $\{1/2 \times W_{PIX}, 3/2 \times W_{PIX}, \ldots, [(2 \times N+1) \times W_{PIX}]/2\}$; the horizontal locations of the sensing units $CS_{12}$~$CS_{N2}$ of the $2^{nd}$ row can be represented as $\{W_{PIX}, 2 \times W_{PIX}, \ldots, [2 \times N \times W_{PIX}]/2\}$; the horizontal locations of the sensing units $CS_{1K}$~$CS_{NK}$ of the $K^{th}$ row can be represented as $\{[1/2+(K-1)/2] \times W_{PIX}, [3/2+(K-1)/2] \times W_{PIX}, \ldots, [(2 \times N-1)/2+(K-1)/2] \times W_{PIX}\}_5$ and so on.

Figure 10:
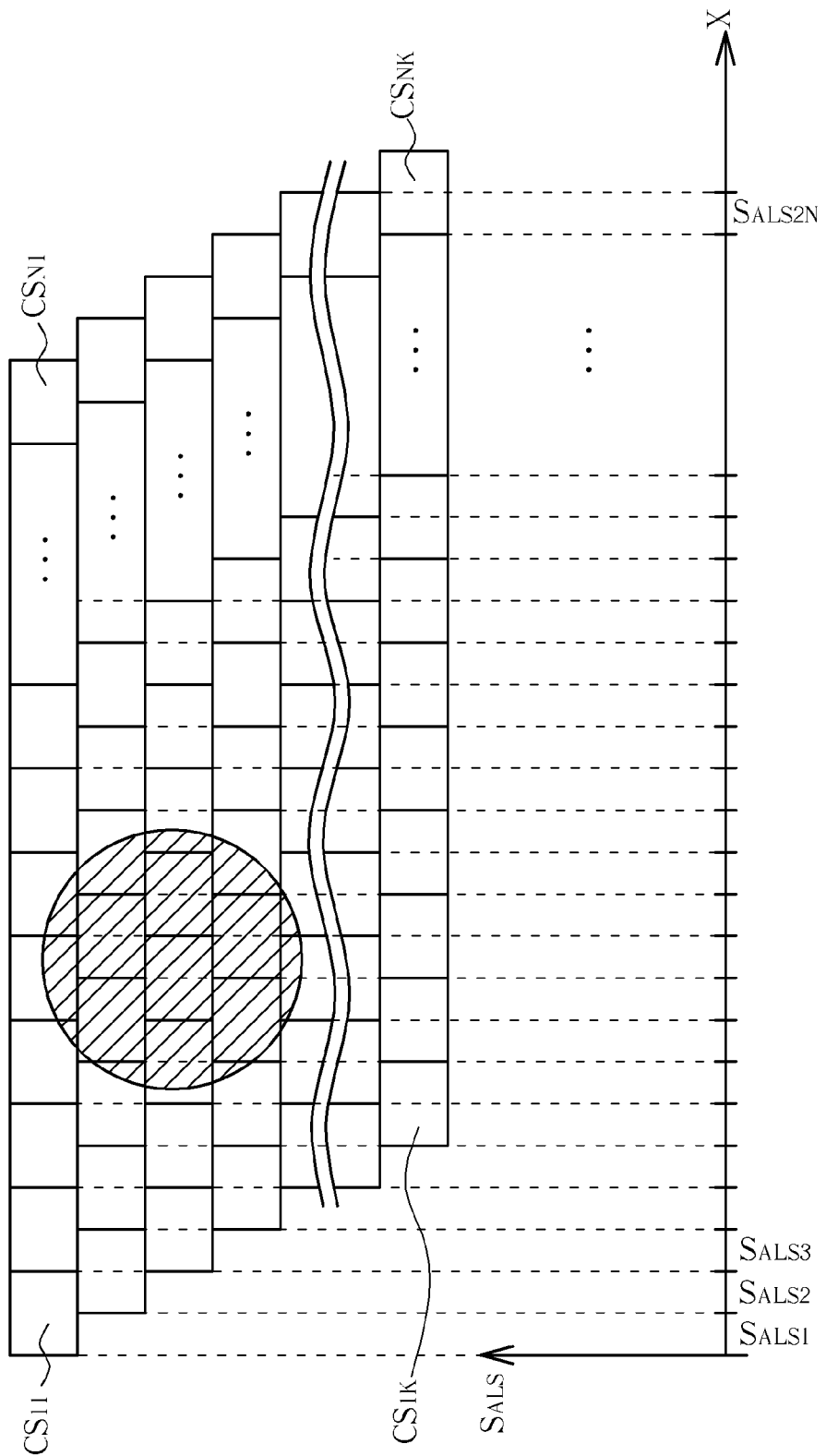
FIG. 10 is a diagram illustrating the operation principle of detecting the imaging location of the reflecting light by the image sensor of FIG. 9.

Please refer to FIG. 10. FIG. 10 is a diagram illustrating the operation principle of detecting the imaging location $D_{CS}$ of the reflecting light $L_{RD}$ by the image sensor 900. The circle shown in the upper part of FIG. 9 represents the imaging location of the reflecting light $L_{RD}$ on the image sensor 900. The accumulated light-sensed signals generated according to the light-sensed signals of the sensing units $CS_{11}$~$CS_{NK}$ of the image sensor 900 are $S_{ASL1}$~$S_{ALSN}$. The sensing range corresponding to the accumulated light-sensed signals $S_{ALS1}$ is the horizontal locations $0$~$W_{PIX}/2$. Since among the sensing units $CS_{11}$~$CS_{NK}$, only the sensing range of the sensing unit $CS_{11}$ has a part in the sensing range corresponding to the accumulated light-sensed signals $S_{ALS1}$, the accumulated light-sensed signal $S_{ALS1}$ is equal to the value of the light-sensed signal generated by the sensing unit $CS_{11}$. The sensing range corresponding to the accumulated light-sensed signals $S_{ALS2}$ is $W_{PIX} \times /2$~$W_{PIX}$. Since among the sensing units $CS_{11}$~$CS_{NK}$, the sensing range of the sensing unit $CS_{11}$ and the sensing range of the sensing unit $CS_{21}$ both have a part in the sensing range corresponding to the accumulated light-sensed signals $S_{ALS2}$, the accumulated light-sensed signal $S_{ALS2}$ is obtained by summing the light-sensed signals generated by the sensing unit $CS_{11}$ and $CS_{21}$. The other accumulated light-sensed signals can be obtained in similar way. Among the accumulated light-sensed signals $S_{ALS1}$~$S_{ALS2N}$, if the accumulated light-sensed signal $S_{ALSF}$ has the maximum value, it represents that the imaging location of the reflecting light $L_{RD}$ (that is, the center of the circle) is at the sensing units $CS_{F1}$~$CS_{FK}$ of the $F^{th}$ column. For instance, as shown in FIG. 10, the accumulated light-sensed signal $S_{ALS10}$ has the maximum value. Thus, the imaging location of the reflecting light $L_{RD}$ (that is, the center of the circle) is determined to be at the horizontal location of the accumulated light-sensed signal $S_{ALS10}$. Since the sensing range corresponding to the accumulated light-sensed signal $S_{ALS10}$ is $9/2 \times W_{PIX}$~$5 \times W_{PIX}$. Consequently, the horizontal location of the accumulated light-sensed signal $S_{ALS10}$ is represented as $19/4 \times W_{PIX}$. In this way, the horizontal location $19/4 \times W_{PIX}$ represents the imaging location $D_{CS}$ of the reflecting light $L_{RD}$.

Comparing with the image sensor 700, the image sensor 900 has a higher resolution. For example, when the image location $D_{CS}$ of the reflecting light $L_{RD}$ is detected by the image sensor 700, if the horizontal location of the image location $D_{CS}$ of the reflecting light $L_{RD}$ (the center of the circle) is actually $(17/4) \times W_{PIX}$, the accumulated light-sensed signal $S_{ALS5}$ has the maximum value. Therefore, the image location $D_{CS}$ of the reflecting light $L_{RD}$ is represented by the horizontal location $9/2 \times W_{PIX}$ of the 5$^{th}$ column. However, if the horizontal location of the image location $D_{CS}$ of the reflecting light $L_{RD}$ (the center of the circle) changes to $(19/4) \times W_{PIX}$, the accumulated light-sensed signal $S_{ALS5}$ still has the maximum value. That is, although the actual horizontal location of the imaging location $D_{CS}$ of the reflecting light $L_{RD}$ has already changed from $(17/4) \times W_{PIX}$ to $(19/4) \times W_{PIX}$, the imaging location $D_{CS}$ of the reflecting light $L_{RD}$ is still represented as $9/2 \times W_{PIX}$ (the horizontal location of the 5$^{th}$ column) by means of the image sensor 700. However, when the image location $D_{CS}$ of the reflecting light $L_{RD}$ is detected by the image sensor 900, if the horizontal location of the image location $D_{CS}$ of the reflecting light $L_{RD}$ (the center of the circle) is actually $(17/4) \times W_{PIX}$, the accumulated light-sensed signal $S_{ALS9}$ has the maximum value. Therefore, the image location $D_{CS}$ of the reflecting light $L_{RD}$ is represented by the horizontal location $17/4 \times W_{PIX}$ of the 9$^{th}$ column. If the horizontal location of the image location $D_{CS}$ of the reflecting light $L_{RD}$ (the center of the circle) changes to $(19/4) \times W_{PIX}$, the accumulated light-sensed signal $S_{ALS10}$ has the maximum value. As a result, the image location $D_{CS}$ of the reflecting light $L_{RD}$ is represented by the horizontal location $19/4 \times W_{PIX}$ of the 10$^{th}$ column. Consequently, the imaging location $D_{CS}$ of the reflecting light $L_{RD}$ are more accurately detected by the image sensor 900. In conclusion, by shifting the horizontal locations of each sensing unit of the same column, the image sensor 900 has the higher resolution than the image sensor 700.

However, in the image sensor 900, the shifting distances between the adjacent rows of the sensing units do not have to be the same. For example, the shifting distance between the 1$^{st}$ and the 2$^{nd}$ rows of the sensing units is $W_{PIX}/2$; the shifting distance between the 2$^{nd}$ and the 3$^{rd}$ rows of the sensing units is $W_{PIX}/4$. By such organization, the imaging location $D_{CS}$ of the reflecting light $L_{RD}$ still can be detected by the method illustrated in FIG. 10.

Figure 11:
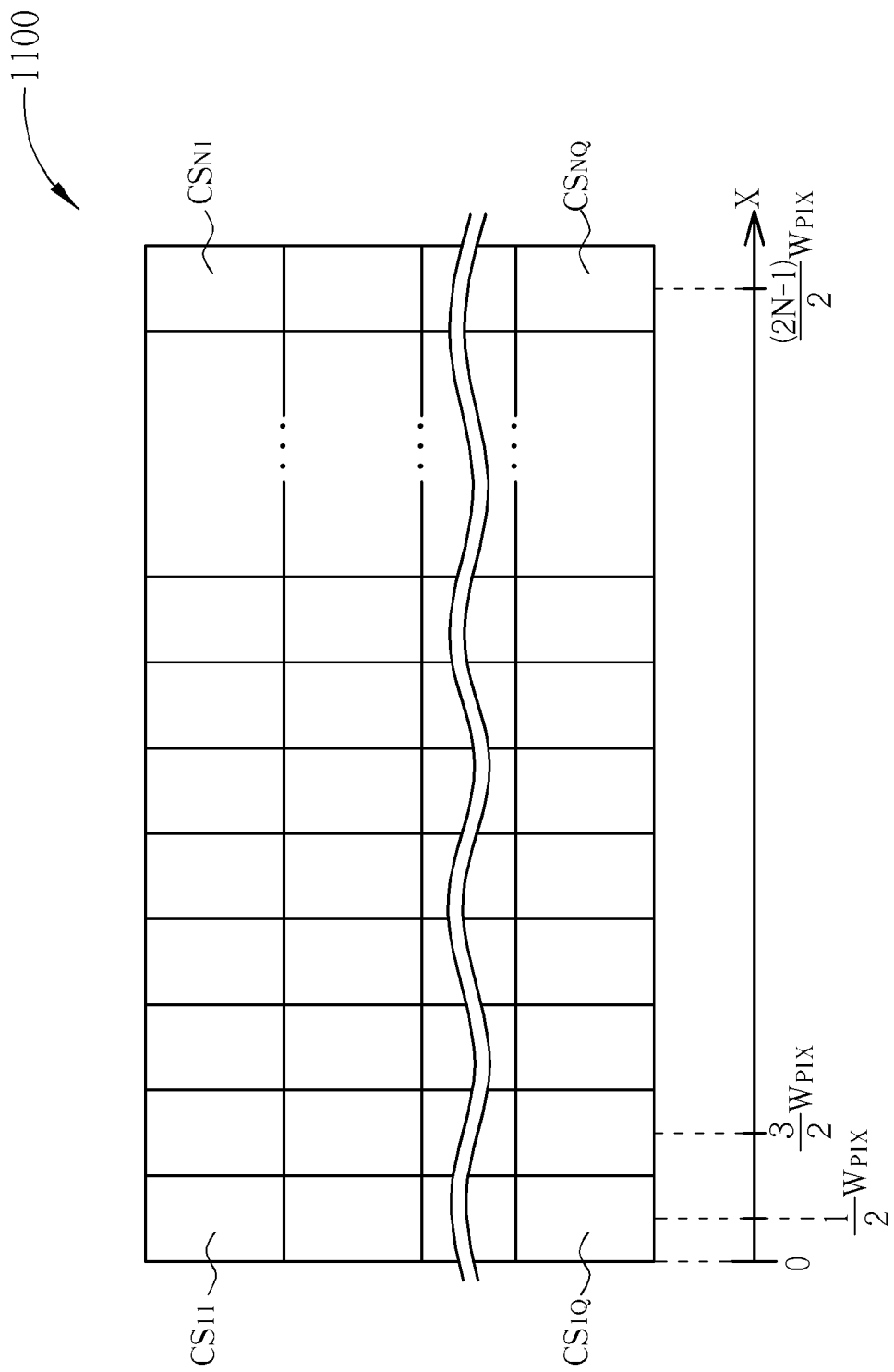
FIG. 11 is a diagram illustrating the structure of an image sensor according to another embodiment of the present invention.

Please refer to FIG. 11. FIG. 11 is a diagram illustrating the structure of an image sensor 1100 according to another embodiment of the present invention. As shown in FIG. 11, the M sensing units of the image sensor 1100 are arranged in N columns and Q rows. Comparing the image sensor 1100 with the image sensor 700, it can be understood that each sensing unit in the image sensor 700 is a square. However, each sensing unit in the image sensor 1100 is a rectangle. For instance, both the width and the height of each sensing unit of image sensor 700 are equal to $W_{PIX}$, but, the width of each sensing unit of image sensor 1100 is $W_{PIX}$ and the height of each sensing unit of image sensor 1100 is $(W_{PIX} \times K/Q)$, wherein Q<K. That is, the long side of each sensing unit of image sensor 1100 is in the vertical direction, and the short side of each sensing unit of image sensor 1100 is in the horizontal direction (the X-axis direction). In other words, each sensing unit of image sensor 1100 has the same width as the each sensing unit of image sensor 700. Although the number Q is smaller than the number K, the total area of the sensing units of one column of the image sensor 1100 is still equal to the total area of the sensing units of one column of the image sensor 700. Similar to the image sensor 700, the image sensor 1100 also provides M light-sensed signals generated by the M sensing units to the distance-calculating circuit 140, so that the distance-calculating circuit 140 calculates the accumulated light-sensed signals $S_{ALS1} \sim S_{ALSN}$. For example, the accumulated light-sensed signal generated by summing the light-sensed signals of the sensing units $CS_{11} \sim CS_{1Q}$ of the 1$^{st}$ column is $S_{ALS1}$, the accumulated light-sensed signal generated by summing the light-sensed signals of the sensing units $CS_{21} \sim CS_{2Q}$ of the 2$^{nd}$ column is $S_{ALS2}$, the accumulated light-sensed signal generated by summing the light-sensed signals of the sensing units $CS_{N1} \sim CS_{NQ}$ of the N$^{th}$ column is $S_{ALSN}$, and so on. In this way, the distance-calculating circuit 140 obtains the imaging location $D_{CS}$ of the reflecting light $L_{RD}$ according to the accumulated light-sensed signals $S_{ALS1} \sim S_{ALSN}$ by the method illustrated in FIG. 8, and accordingly calculates the measured distance $D_M$.

Comparing with the image sensor 700, it can be seen that in the image sensor 1100, the side of each sensing unit in the vertical direction is longer, so that the number of sensing units of one column is reduced (that is Q<K). Therefore, the number of the accumulating times which the distance-calculating circuit 140 generates the accumulated light-sensed signals $S_{ALS1} \sim S_{ALSN}$, is reduced as well. Since the total area of the sensing units of one column of the image sensor 1100 is the same as the total area of the sensing units of one column of the image sensor 700, the received energy of the sensing units of each column sensing the light focused by the lens $LEN_1$ remains unchanged. In other words, when the imaging location $D_{CS}$ of the reflecting light $L_{RD}$ is measured by means of the image sensor 1100, the computation of the distance-calculating circuit 140 generating the accumulated light-sensed signals $S_{ALS1} \sim S_{ALSN}$ is reduced, and the noise-to-signal ratios of the accumulated light-sensed signals $S_{ALS1} \sim S_{ALSN}$ are maintained at the same time. In addition, the short side of the sensing units of each column of the image sensor 1100 is in the horizontal direction and the width of each column sensing units is $W_{PIX}$. In other words, when the imaging location $D_{CS}$ of the reflecting light $L_{RD}$ is measured, the image sensor 1100 has the same resolution as the image sensor 700. Thus, comparing with the image sensor 700, it can be seen that the image sensor 1100 reduces the computation of the distance-calculating circuit 140 generating the accumulated light-sensed signals $S_{ALS1} \sim S_{ALSN}$ and maintains the resolution of the imaging location $D_{CS}$ in the horizontal direction (that is, the direction of the short side) and the signal-to-noise ratios of the accumulated light-sensed signals as well.

Figure 12:
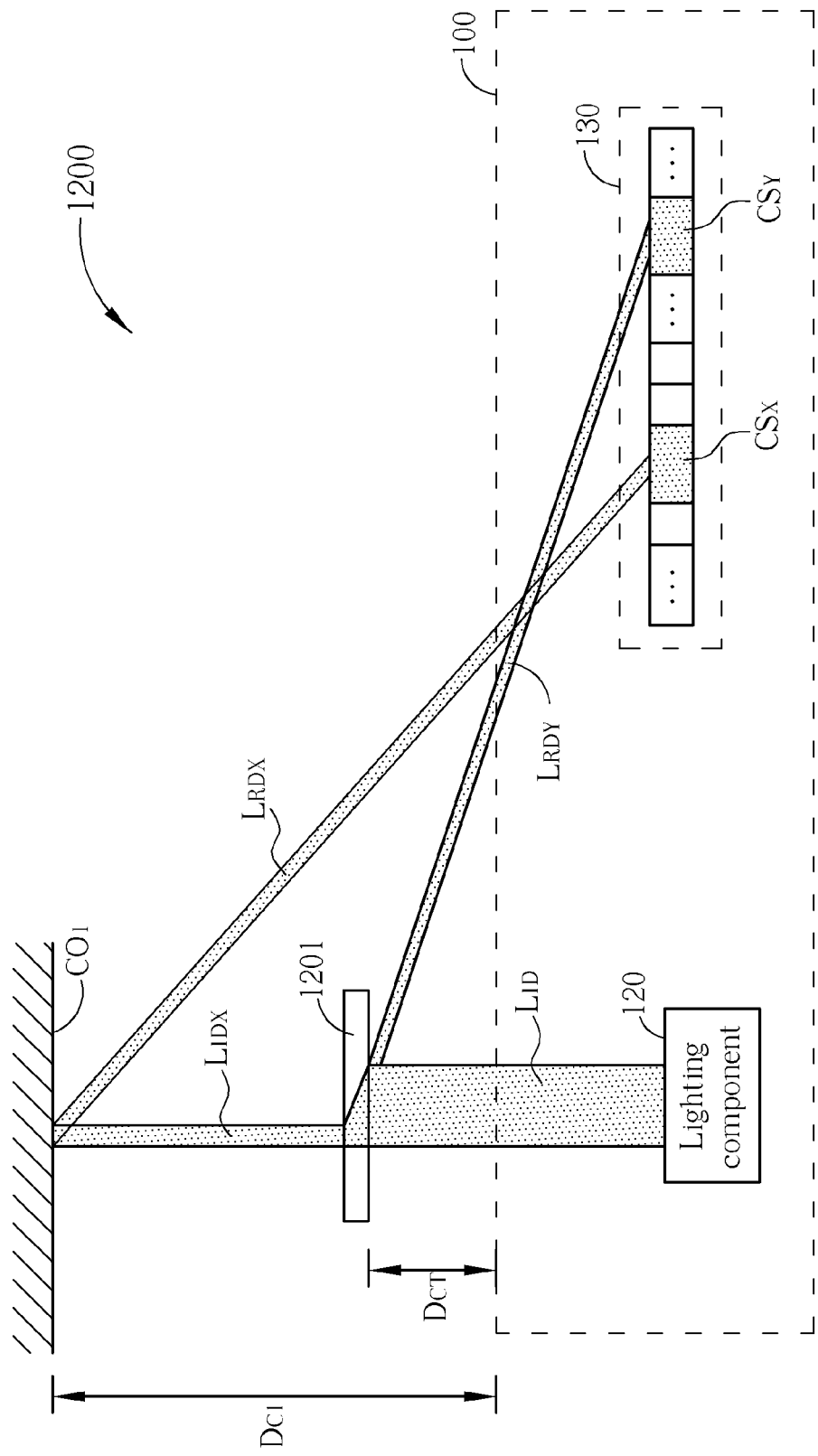
FIG. 12 is a diagram illustrating a distance-measuring system 1200 with a correction function of the present invention.

Please refer to FIG. 12. FIG. 12 is a diagram illustrating a distance-measuring system 1200 with a correction function of the present invention. As shown in FIG. 12, the distance-measuring system 1200 includes a distance-measuring device 100 and a transflective plate 1201. For the sake of convenience, only a part of components (i.e., the light emitting device 120 and the image sensor 130) of the distance-measuring device 100 are illustrated in FIG. 12 while other components of the distance-measuring device 100 are omitted in FIG. 12. As the above descriptions corresponding to FIG. 4-FIG. 6, for calibrating the lighting-error angle and the sensing-error angle of the distance-measuring device 100, the distance-measuring device 100 has to exercise two times of the calibration process. That is, the distance-measuring device 100 needs to emit two times of the detecting light $L_{ID}$ for deriving the lighting-error angle and the sensing-error angle respectively. Comparing to the distance-measuring device 100, the distance-measuring system 1200 determines both the lighting-error angle and the sensing-error angle by executing the calibration process once. That is, both the lighting-error angle and the sensing-error angle are derived by the distance-measuring system 1200 emitting the detecting light $L_{ID}$ once. The detailed operations are disclosed in the following descriptions. In addition, for further clarifying the operating structure of the distance-measuring system 1200, a width of the light in FIG. 12 herein represents the corresponding intensity of the light.

A distance between the transflective plate 1201 and the distance-measuring device 100 is the known distance $D_{CT}$ while a distance between the calibrating object $CO_1$ and the distance-measuring device 100 is the known distance $D_{C1}$. A characteristic of the transflective plate 1201 is that: when a light emits to the transflective plate 1201, a part of the light will be reflected by the transflective plate 1201 while the rest of the light will pass through the transflective plate 1201. When the light emitting device 120 emits the detecting light $L_{ID}$, the detecting light $L_{ID}$ first arrives the transflective plate 1201, and a first part of the detecting light $L_{ID}$ passes through the transflective plate 1201, and becomes the detecting light $L_{IDX}$ while the rest of the detecting light $L_{ID}$ is reflected by the transflective plate 1201 and becomes the reflecting light $L_{RDY}$. Then the reflecting light $L_{RDY}$ emits to the image sensor 130 at the sensing unit $CS_Y$ (i.e., the imaging location $D_{CSY}$), and the detecting light $L_{IDX}$ reaches the calibrating object $CO_1$, and is reflected by the calibrating object $CO_1$, thereby becomes the reflecting light $L_{RDX}$. The reflecting light $L_{RDX}$ emits to the image sensor 130 at the sensing unit $CS_X$ (i.e., the imaging location $D_{CSX}$). In this way, the parameter-calculating circuit 150 derives the lighting-error angle and the sensing-error angle according to the known distances $D_{C1}$ and $D_{CT}$, and the imaging locations $D_{CSX}$ and $D_{CSY}$. The parameter-calculating circuit 150 then determines the calibration parameters A and B accordingly, and makes the distance-calculating circuit 140 deriving the correct measured distance $D_M$ by referring to the calibration parameters A and B.

Besides, the distance-measuring system 1200 adjusts the transmittance of the transflective plate 1201 for the emitting light to make the intensity of the reflecting light $L_{RDX}$ is about the same as that of the reflecting light $L_{RDY}$. Thus, the signal noise rate (SNR) is effectively promoted. For simplification, in FIG. 12, the reflecting light $L_{RDX}$ is illustrated to emit to the image sensor 130 directly. Actually, the reflecting light $L_{RDX}$ passes the transflective plate 1201 and makes a part of the reflecting light $L_{RDX}$ being reflected by the transflective plate 1201, thereby further reduce the intensity of the reflecting light $L_{RDX}$. Therefore, supposed that a passing ratio of a light emitting to the transflective plate 1201 is M/N, wherein N is larger than M, and a reflecting ration of the calibrating object is K/L, wherein L is larger than K, then the intensity of the reflecting light $L_{RDX}$ and $L_{RDY}$ emitting to the image sensor 130, comparing to the intensity (Q) of the original detecting light $L_{ID}$, are derived by the following formulas:

$$Q_X = (M/N) \times (K/L) \times (M/N);$$

$$Q_Y = (N-M/N);$$

For example, supposing that M/N is 65%, and K/L is 90%, then the intensity $Q_X$ is 65%×90%×65%=38%; and the intensity $Q_Y$ is equality to 35%. That is, the intensity of the reflecting light $L_{RDX}$ and $L_{RDY}$ emitting to the image sensor 130 are about the same.

Figure 13:
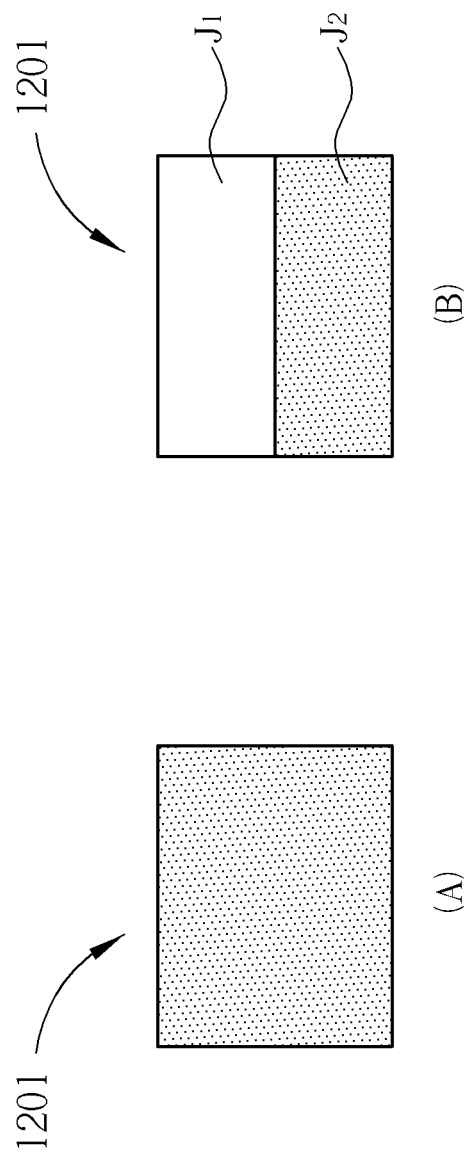
FIG. 13 is a diagram illustrating two exemplary embodiments of the transflective plate 1201 of the present invention.

Please refer to FIG. 13. FIG. 13 is a diagram illustrating two exemplary embodiments of the transflective plate 1201 of the present invention. In FIG. 13 (A), the transflective plate 1201 can be a whole piece of a transflective plate with a transmittance. The transmittance is for the wavelength of the detecting light outputting by the light emitting device 120. For instance, if the detecting light outputted by the light emitting device 120 is infrared rays, then the transflective plate 1201 illustrated in FIG. 13 (A) is with a transmittance for the infrared rays. Besides, as shown in FIG. 13(B), the transflective plate 1201 can be constructed by two parts: $J_1$ and $J_2$. The part $J_1$ of the transflective plate 1201 is transparent for the detecting light $L_{ID}$ outputting by the light emitting device 120. That is, the detecting light $L_{ID}$ can fully pass the part $J_1$ of the transflective plate 1201. The part $J_2$ of the transflective plate 1201 is opaque for the detecting light $L_{ID}$ outputted by the light emitting device 120. That is, the detecting light $L_{ID}$ is completely reflected by the part $J_2$ of the transflective plate 1201. Hence when the light emitting device 120 outputs the detecting light $L_{ID}$, a part of the detecting light $L_{ID}$ emits to the part $J_1$ of the transflective plate 1201 and thereby becomes the detecting light $L_{IDX}$ while a part of the detecting light $L_{ID}$ emits to the part $J_2$ of the transflective plate 1201 and reflected by the transflective plate 1201, and becomes the reflecting light $L_{RDY}$. In this way, the light emitting to the transflective plate 1201 illustrated in FIG. 13 (B) has the same results as the light emitting to the transflective plate 1201 illustrated in FIG. 13 (A).

In conclusion, the distance-measuring system with a correction function provided by the present invention, with a transflective plate, derives and calibrates the assembling-error angles by outputting detecting light once, providing a great convenience.

Those skilled in the art will readily observe that numerous modifications and alterations of the device and method may be made while retaining the teachings of the invention.

What is claimed is:

1. A distance-measuring system with a correction function, comprising:
   a calibrating object;
   a transflective plate; and
   a distance-measuring device, respectively having a first known distance and a second known distance between the calibrating object and the transflective plate, the transflective plate disposed between the calibrating object and the distance-measuring device, the distance-measuring device comprising:
   a light emitting device, for emitting a detecting light having a lighting-error angle;
   an image sensor, having a sensing-error angle;
   wherein the detecting light passing through the transflective plate is reflected by the calibrating object and then is transferred into a first reflecting light transmitting to a first imaging location of the image sensor, the detecting light reflected by the transflective plate is transferred into a second reflecting light transmitting to a second imaging location of the image sensor; and
   a parameter-calculating circuit, for calculating the lighting-error angle and the sensing-error angle according to the first and second known distances, and the first and second imaging locations.

2. The distance-measuring system of claim 1, wherein intensity of the first reflecting light is substantially the same as that of the second reflecting light.

3. The distance-measuring system of claim 1, wherein the transflective plate has a particular transmittance for the detecting light.

4. The distance-measuring system of claim 1, wherein the transflective plate comprises a first part and a second part, and the first part of the transflective plate is transparent for the detecting light while the second part of the transflective plate is opaque for the detecting light.

5. The distance-measuring system of claim 4, wherein the detecting light emitting to the second part of the transflective plate is reflected and becomes the second reflecting light.

6. The distance-measuring system of claim 1, wherein the distance-measuring device further comprises a first lens; the light emitting device is utilized for emitting a detecting light to a measured object for the measured object generating a reflecting light, the first lens is utilized for focusing a background light or the reflecting light, and the image sensor is utilized for sensing an energy of a light focused by the first lens so as to generate M light-sensed signals.

7. The distance-measuring system of claim 6, wherein the distance-measuring device further comprises:
   a lighting/sensing controlling circuit, for controlling the light emitting device to emit the detecting light and controlling the image sensor to sense the energy of the light focused by the first lens during a distance-sensing phase, so that the image sensor generates M first light-sensed signals, and for controlling the light emitting device not to emit the detecting light and controlling the image sensor to sense the energy of the light focused by the first lens during a noise-sensing phase, so that the image sensor generates M second light-sensed signals; wherein M represents a positive integer; and
   a distance-calculating circuit, for determining an imaging location of the reflecting light on the image sensor according to the M first light-sensed signals and the M second light-sensed signals, and calculating a measured distance between the distance-measuring device and the measured object according to the imaging location, a focus length of the first lens, and a predetermined distance between the light emitting device and the image sensor.

8. A calibrating method for calibrating a distance-measuring device, comprising:
   disposing a transflective plate between the distance-measuring device and a calibrating object;
   wherein the distance-measuring device respectively has a first known distance and a second known distance between the transflective plate and the calibrating object;
   a light emitting device of the distance-measuring device emitting a detecting light for making a first part of the detecting light passing the transflective plate and reflected by the calibrating object, thereby becoming a first reflecting light while a second part of the detecting light being reflected by the transflective plate and becoming a second reflecting light;
   the first reflecting light emitting to a first imaging location of an image sensor of the distance-measuring device;
   the second reflecting light emitting to a second imaging location of the image sensor of the distance-measuring device; and
   calculating at least an error angle of the distance-measuring device according to the first and second known distances, and the first and second imaging locations.

9. The calibrating method of claim 8, wherein the error angle is a lighting-error angle of the light emitting device.

10. The calibrating method of claim 8, wherein the error angle is a sensing-error angle of the image sensor.

11. The calibrating method of claim 8, wherein intensity of the first reflecting light is about the same as that of the second reflecting light.

12. The calibrating method of claim 8, wherein the transflective plate has a particular transmittance for the detecting light.

13. The calibrating method of claim 8, wherein the transflective plate comprises a first part and a second part, and the first part of the transflective plate is transparent for the detecting light while the second part of the transflective plate is opaque for the detecting light.

14. The calibrating method of claim 13, wherein the detecting light emitting to the second part of the transflective plate is reflected and becomes the second reflecting light.

* * * * *